(12) United States Patent
Tamakoshi

(10) Patent No.: US 7,862,108 B2
(45) Date of Patent: Jan. 4, 2011

(54) VEHICLE LOWER BODY STRUCTURE

(75) Inventor: Koji Tamakoshi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 12 days.

(21) Appl. No.: 12/309,523

(22) PCT Filed: Jul. 24, 2007

(86) PCT No.: PCT/IB2007/002089

§ 371 (c)(1),
(2), (4) Date: Jan. 22, 2009

(87) PCT Pub. No.: WO2008/015518

PCT Pub. Date: Feb. 7, 2008

(65) Prior Publication Data

US 2009/0243343 A1 Oct. 1, 2009

(30) Foreign Application Priority Data

Aug. 4, 2006 (JP) ............................. 2006-213392

(51) Int. Cl.
*B62D 25/20* (2006.01)
(52) U.S. Cl. ..................... 296/203.03; 296/203.02; 296/204
(58) Field of Classification Search .......... 296/203.02, 296/187.09, 30, 29, 187.03, 187.08, 204, 296/209, 203.03
See application file for complete search history.

(56) References Cited

U.S. PATENT DOCUMENTS

| | | | | |
|---|---|---|---|---|
| 3,765,715 A | * | 10/1973 | Franchini | ............... 296/187.05 |
| 4,804,222 A | * | 2/1989 | Sakiyama et al. | ...... 296/203.02 |
| 4,944,553 A | | 7/1990 | Medley et al. | |
| 5,011,201 A | * | 4/1991 | Takahashi et al. | ...... 296/203.02 |
| 5,020,846 A | * | 6/1991 | Bonnett | ................... 296/181.4 |
| 5,882,065 A | | 3/1999 | Koiwa et al. | |
| 2002/0067053 A1 | * | 6/2002 | Wolkersdorfer et al. | ..... 296/204 |
| 2006/0249969 A1 | | 11/2006 | Gruneklee et al. | |

FOREIGN PATENT DOCUMENTS

| | | |
|---|---|---|
| JP | A-61-215178 | 9/1986 |
| JP | U-02-042875 | 3/1990 |
| JP | A-04-215574 | 8/1992 |
| JP | A-05-085419 | 4/1993 |

(Continued)

*Primary Examiner*—Patricia L Engle
*Assistant Examiner*—SunSurraye Westbrook
(74) *Attorney, Agent, or Firm*—Oliff & Berridge, PLC

(57) ABSTRACT

A vehicle lower body structure (1) including a vehicle compartment; a windshield pillar (3) that is provided at the side portion the vehicle and that extends in the vehicle-height direction; a rocker (4) that is connected, at the front end portion, to the lower end portion of the windshield pillar (3) and the extends in the longitudinal direction of the vehicle; a floor tunnel member (5) that is provided at the lateral center portion of the vehicle and that extends in the longitudinal direction of the vehicle; a floor cross-member (6) that is connected to the rocker (4) and the floor tunnel member (5) and that extends in the vehicle-width direction; and a floor panel (7) that is connected to the windshield pillar (3), the rocker (4), the floor tunnel member (5), and the floor cross-member (6) and that forms the floor of the vehicle compartment.

9 Claims, 23 Drawing Sheets

FOREIGN PATENT DOCUMENTS

| | | |
|---|---|---|
| JP | A-08-026139 | 1/1996 |
| JP | A-2000-006836 | 1/2000 |
| JP | A-2000-211549 | 8/2000 |
| JP | A-2003-237636 | 8/2003 |
| WO | WO 2005/018847 A1 | 3/2005 |

* cited by examiner

VEHICLE LOWER BODY STRUCTURE

BACKGROUND OF THE INVENTION

1. Field of the Invention

The invention relates to a vehicle lower body structure.

2. Description of Related Art

Japanese Patent Application Publication No. 2003-237636 (JP-A-2003-237636) describes a vehicle structure with which a load applied to a vehicle due to a collision (hereinafter, referred to as a "collision load") is transferred to a frame structural member of the vehicle, whereby deformation of a vehicle compartment is minimized. In the vehicle structure described in JP-A-2003-237636, a floor cross-member is attached to the floor pan and extends obliquely from a side sill (hereinafter, referred to as a "rocker") toward a lateral center member (hereinafter, referred to as a "floor pan tunnel member").

In the described structure, a collision load transferred to the rocker when an offset collision occurs is efficiently transferred via the floor cross-member to the floor pan tunnel member.

However, a bumper beam is usually above the level of the rocker in a vehicle. Accordingly, if an offset collision or the like occurs and a vehicle collides directly against a windshield pillar of the host vehicle, a collision load is applied to the windshield pillar from a position above the rocker. When a collision load is applied to the windshield pillar via a front tire of the host vehicle, the collision load may be applied to the windshield pillar from a position above the rocker.

With the structure described in JP-A-2003-237636, a collision load is efficiently transferred from the rocker to the floor pan tunnel member. However, if a collision load is applied to the windshield pillar from a position above the rocker, the collision load is not efficiently transferred to reinforced members such as the floor pan tunnel member to be dispersed. Accordingly, deformation of a vehicle compartment due, for example, to an offset collision is not mitigated.

SUMMARY OF THE INVENTION

The invention provides a vehicle lower body structure with which deformation of a vehicle compartment due, for example, to an offset collision is minimized.

A vehicle lower body structure according to a first aspect of the invention includes a windshield pillar, arranged at a side portion of a vehicle and that extending in the vehicle-height direction; a rocker that is connected, at the front end portion, to the lower end portion of the windshield pillar, and that extends in the longitudinal direction of the vehicle; and a reinforcement member that is connected to the vehicle-compartment-side face of the windshield pillar, at a position above the rocker in the vehicle-height direction, and that transfers a collision load, applied to the windshield pillar, in the vehicle-width direction toward the lateral center of the vehicle and in the longitudinal direction of the vehicle toward the rear of the vehicle.

In the vehicle lower body structure, the reinforcement member is connected to the windshield pillar at a position above the rocker. Accordingly, it is possible to receive the collision load, applied to the windshield pillar, at the position above the rocker, and to transfer the received collision load to the reinforcement member which in turn transfers the collision load in the vehicle-width direction toward the lateral center of the vehicle and in the longitudinal direction of the vehicle toward the rear of the vehicle to disperse the collision load. Generally, the collision load is applied to the windshield pillar due to, for example, an offset collision in the vehicle-width direction toward the lateral center of the vehicle and in the longitudinal direction of the vehicle toward the rear of the vehicle. With the reinforcement member, the collision load that is applied to windshield pillar is transferred in substantially the same direction as the direction in which the collision load is applied to the windshield pillar. As a result, it is possible to more effectively disperse the load.

The reinforcement member may transfer the collision load, applied to the windshield pillar, to the vehicle floor assembly. Thus, it is possible to transfer the collision load, applied to the windshield pillar from a position above the rocker, to the vehicle floor assembly via the reinforcement member and disperse the collision load. As a result, it is possible to more effectively disperse the load due to, for example, an offset collision. The vehicle floor assembly includes the floor panel and floor pan frame members such as the floor cross-member.

The reinforcement member may also be connected to the rear-side face of the windshield pillar, at a position above the rocker in the vehicle-height direction. Thus, it is possible to reliably receive the component in the collision load applied to the windshield pillar from a position above the rocker, the component being applied in the longitudinal direction of the vehicle.

The reinforcement member may be connected, at the other portion, to the rocker. Thus, the reinforcement member efficiently transfers the collision load, transferred from the windshield pillar to the rocker, in the vehicle-width direction toward the lateral center, and disperses the collision load.

The reinforcement member extends in the vehicle width direction toward the lateral center of the vehicle and in the longitudinal direction toward the rear of the vehicle, and may be connected, at an end portion, to a floor cross-member that extends in the vehicle-width direction. In this case, because the end portion of the reinforcement member is connected to the floor cross-member that extends in the vehicle-width direction, the collision load, applied to the windshield pillar from a position above the cocker, is directly transferred to the floor cross-member via the reinforcement member to be dispersed. It is also possible to enhance the strength with which the windshield pillar is supported. As a result, it is possible to further reduce deformation of the vehicle compartment due, for example, to an offset collision.

In this case, the reinforcement member may be formed integrally with the floor cross-member. Thus, it is not necessary to connect the reinforcement member and the floor cross-member to each other. As a result, production time and production cost are reduced.

The reinforcement member may be connected, at an end portion, to a vehicle center frame member that is arranged at the lateral center of the vehicle and that extends in the longitudinal direction of the vehicle. In this case, because the end portion of the reinforcement member is connected to the vehicle center frame member, the collision load, applied to the windshield pillar from a position above the rocker, is directly transferred to the vehicle center frame member via the reinforcement member to be dispersed. It is also possible to increase the strength with which the windshield pillar is supported. As a result, it is possible to further reduce deformation of the vehicle compartment due, for example, to an offset collision.

The vehicle center frame member may be a floor pan tunnel member. Thus, it is possible to transfer the collision load, applied to the windshield pillar from a position above the rocker, directly to the floor pan tunnel portion via the reinforcement member thereby dispersing the collision load.

The vehicle center frame member may be a floorpan reinforcement member that is arranged between a floor tunnel member and the rocker, and that extends in the longitudinal direction of the vehicle. Thus, it is possible to transfer the collision load, applied to the windshield pillar from a position above the rocker, directly to the floor tunnel portion via the reinforcement member, and thereby dispersing the collision load. Connecting the reinforcement member to the floorpan reinforcement member, which is close to the windshield pillar, makes it possible to reduce the length of the reinforcement member, thereby enhancing the efficiency of dispersing the collision load.

The vehicle lower body structure according to the first aspect of the invention may further include a bulkhead that is provided inside the windshield pillar, and that is arranged so as to face the reinforcement member with the windshield pillar interposed between the reinforcement member and the bulkhead. In the vehicle lower body structure, providing the bulkhead so as to face the reinforcement member increases the strength with which the windshield pillar is supported, and enhances the efficiency of transferring the collision load from the windshield pillar to the reinforcement member.

According to the first aspect of the invention, by providing the reinforcement member that is connected to the windshield at a position above the rocker in the vehicle-height direction and that transfers the collision load in the vehicle-width direction toward the lateral center of the vehicle makes it possible to more efficiently disperse the load due, for example to an offset collision.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein.

DETAILED DESCRIPTION OF THE EXAMPLE EMBODIMENTS

Figure 1:
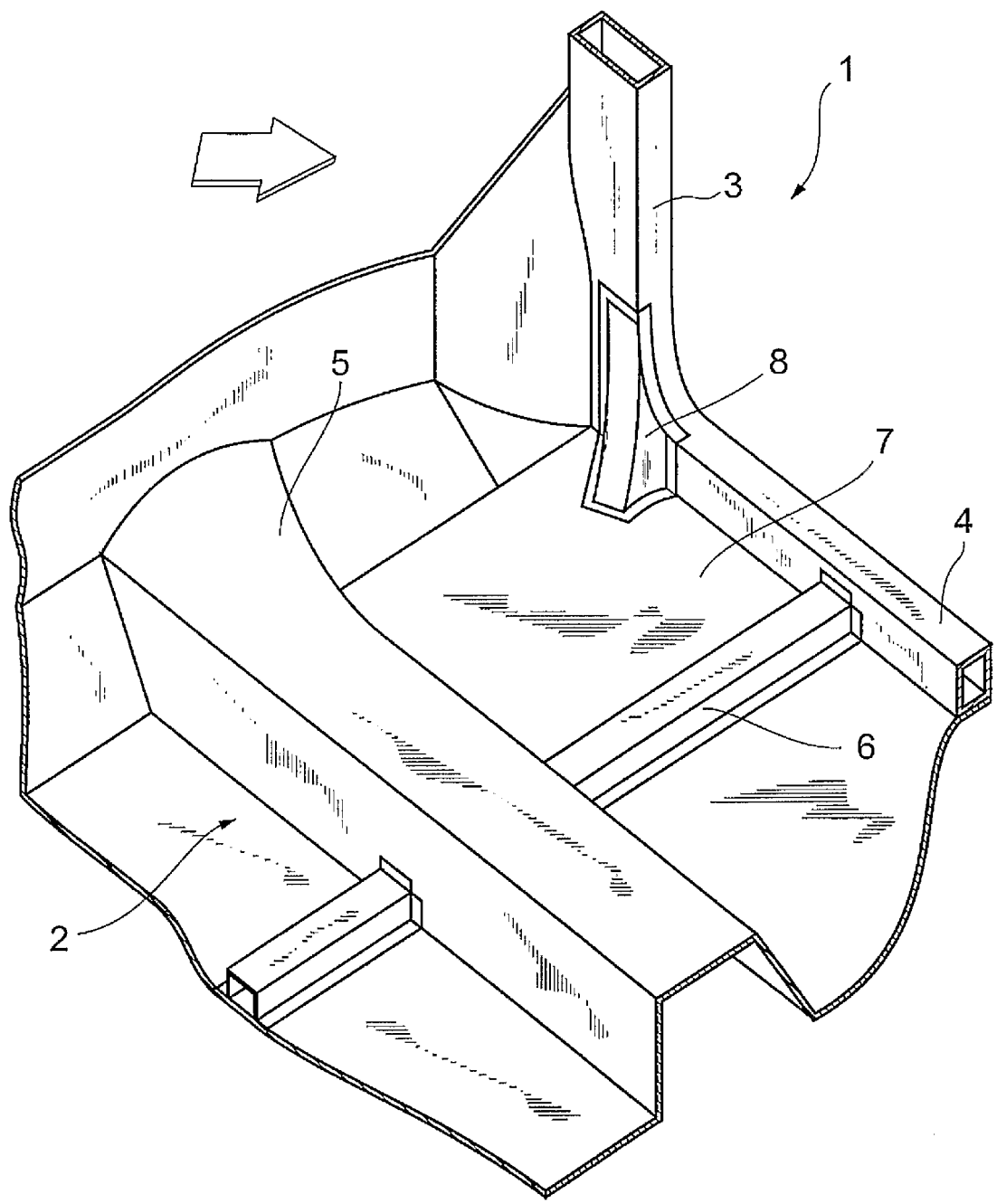
FIG. 1 is the perspective view showing a vehicle lower body structure according to a first embodiment of the invention.

Hereafter, example embodiments of the invention will be described in detail with reference to accompanying drawings. In the drawings, the same or corresponding portions will be denoted by the same reference numerals. In the specification, the positional expressions such as "front", "rear", "right", "left", "above", and "below" denote these positions when the host vehicle is moving forward.

Figure 2:
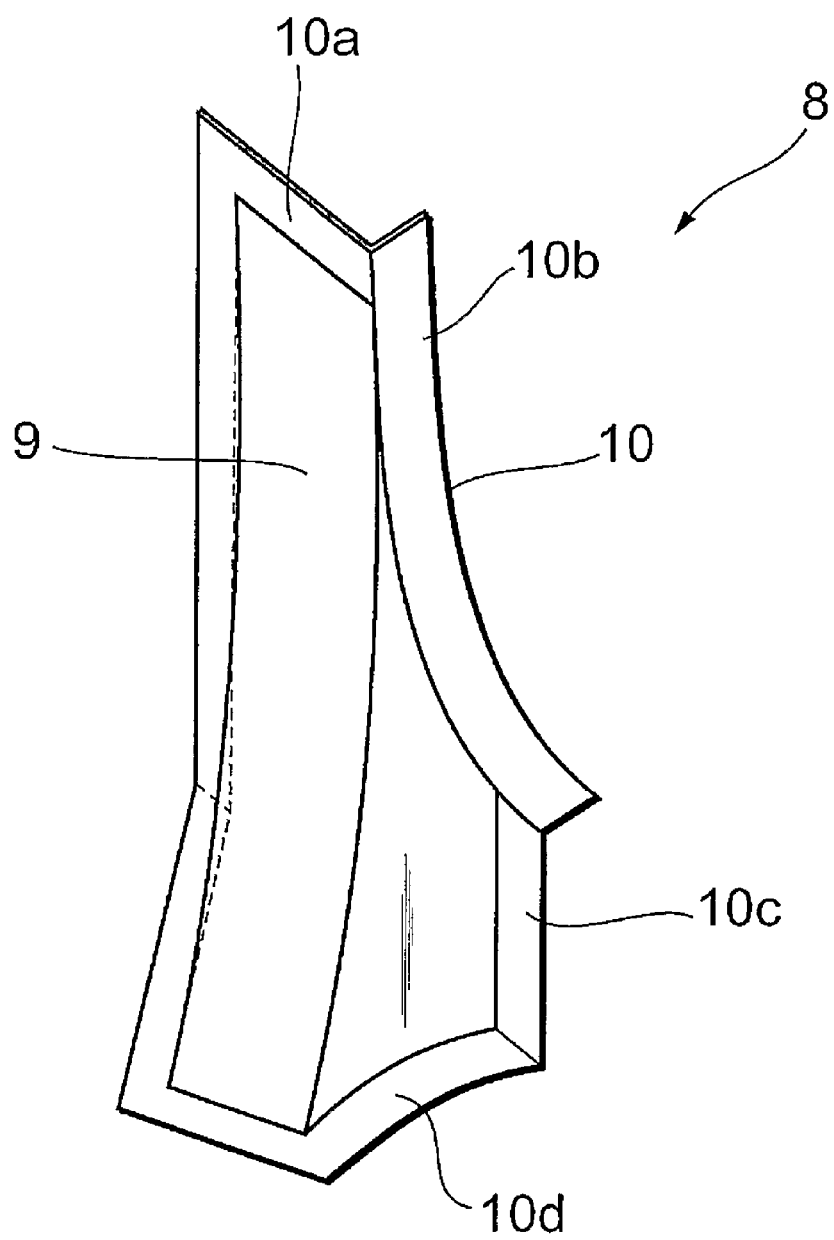
FIG. 2 is the perspective view showing a pillar brace in FIG. 1.

First, a vehicle lower body structure 1 according to a first embodiment of the invention will be described in detail with reference to FIGS. 1 and 2. FIG. 1 is the perspective view showing the vehicle lower body structure 1 according to the first embodiment of the invention. FIG. 2 is the perspective view of a pillar brace 8 in the vehicle lower body structure 1.

As shown in FIG. 1, the vehicle lower body structure 1 includes a vehicle compartment 2; a windshield pillar 3 that is arranged at the side portion of a vehicle and that extends in the vehicle-height direction; and a rocker 4 that is connected, at the front end portion, to the lower end portion of the windshield pillar 3 and that extends in the longitudinal direction of the vehicle. The vehicle lower body structure 1 further includes a floor tunnel member 5 that is arranged at the lateral center portion of the vehicle and that extends in the longitudinal direction of the vehicle; a floor cross-member 6 that is connected to the rocker 4 and the floor tunnel member 5 and that extends in the vehicle-width direction; and a floor panel 7 that is connected to the windshield pillar 3, the rocker 4, the floor tunnel member 5 and the floor cross-member 6 and that forms the floor of the vehicle compartment 2. In addition, the vehicle lower body structure 1 includes the pillar brace 8 that is connected to the windshield pillar 3, the rocker 4, and the floor panel 7. FIG. 1 shows the right front portion of the vehicle compartment. The vehicle lower body structure 1 has bilateral symmetry. Although not shown in FIG. 1, the left front portion of the vehicle compartment has substantially the same vehicle lower body structure as that of the right front portion of the vehicle compartment. The floor tunnel member 5, the floor cross-member 6, and the floor panel 7 correspond to a vehicle floor assembly described in claims.

The pillar brace 8 is connected, at an end, to the windshield pillar 3. The position at which the end of the pillar brace 8 is connected to the windshield pillar 3 is above the rocker 4. The pillar brace 8 extends from the windshield pillar 3 toward the lateral center and the rear of the vehicle compartment. The pillar brace 8 is connected, at the other end, to the floor panel 7. Therefore, the pillar brace 8 reinforces and supports the windshield pillar 3 from the inside of the vehicle.

As shown in FIG. 2, the pillar brace 8 includes a body portion 9 that forms the body of the pillar brace 8; and a flange 10 that is connected to the windshield pillar 3, the rocker 4, and the floor panel 7. The flange 10 of the pillar brace 8 includes a pillar side-face connection portion 10a that is connected to the vehicle-compartment-side face of the windshield pillar 3; a pillar rear-face connection portion 10b that is connected to the face that extends from the rear-side face of the windshield pillar 3 to the top-face of the rocker 4; a rocker side-face connection portion 10c that is connected to the vehicle-compartment-side face of the rocker 4; and a floor panel connection portion 10d that is connected to the floor panel 7. The flange 10 of the pillar brace 8 may be connected to the windshield pillar 3, the rocker 4, and the floor panel 7 by welding, or with bolts, etc.

Figure 3A:
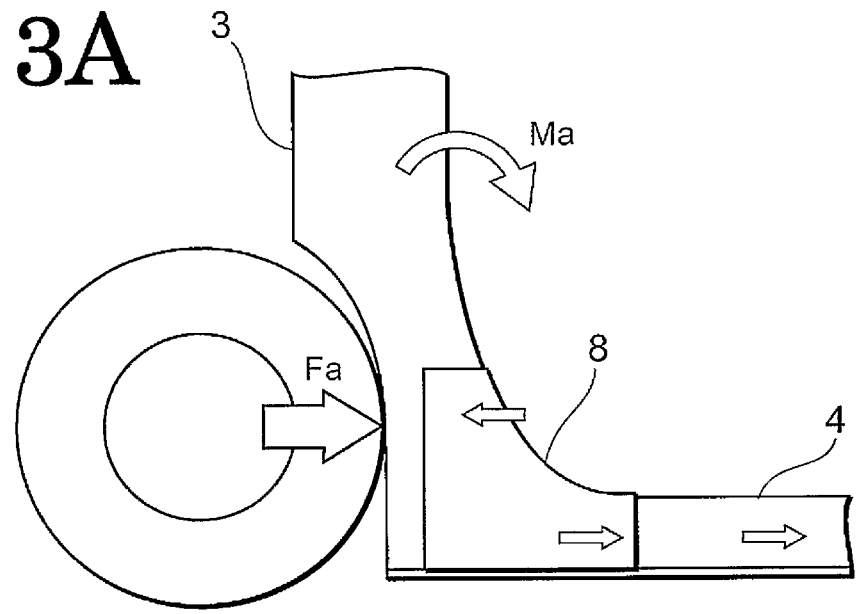
FIG. 3 is the view showing the manner in which a collision load is transferred in the vehicle lower body structure in FIG. 1.
Figure 3B:
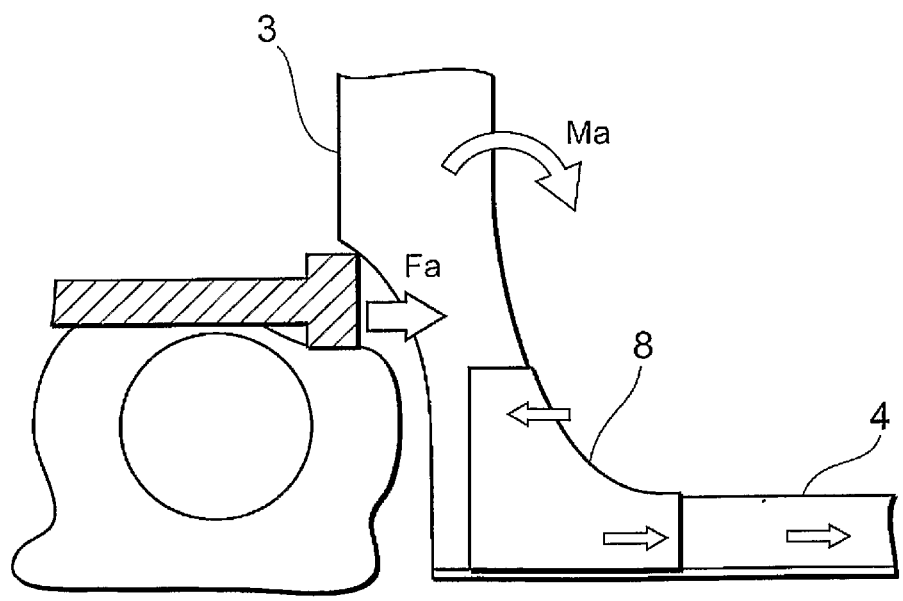
Figure 4:
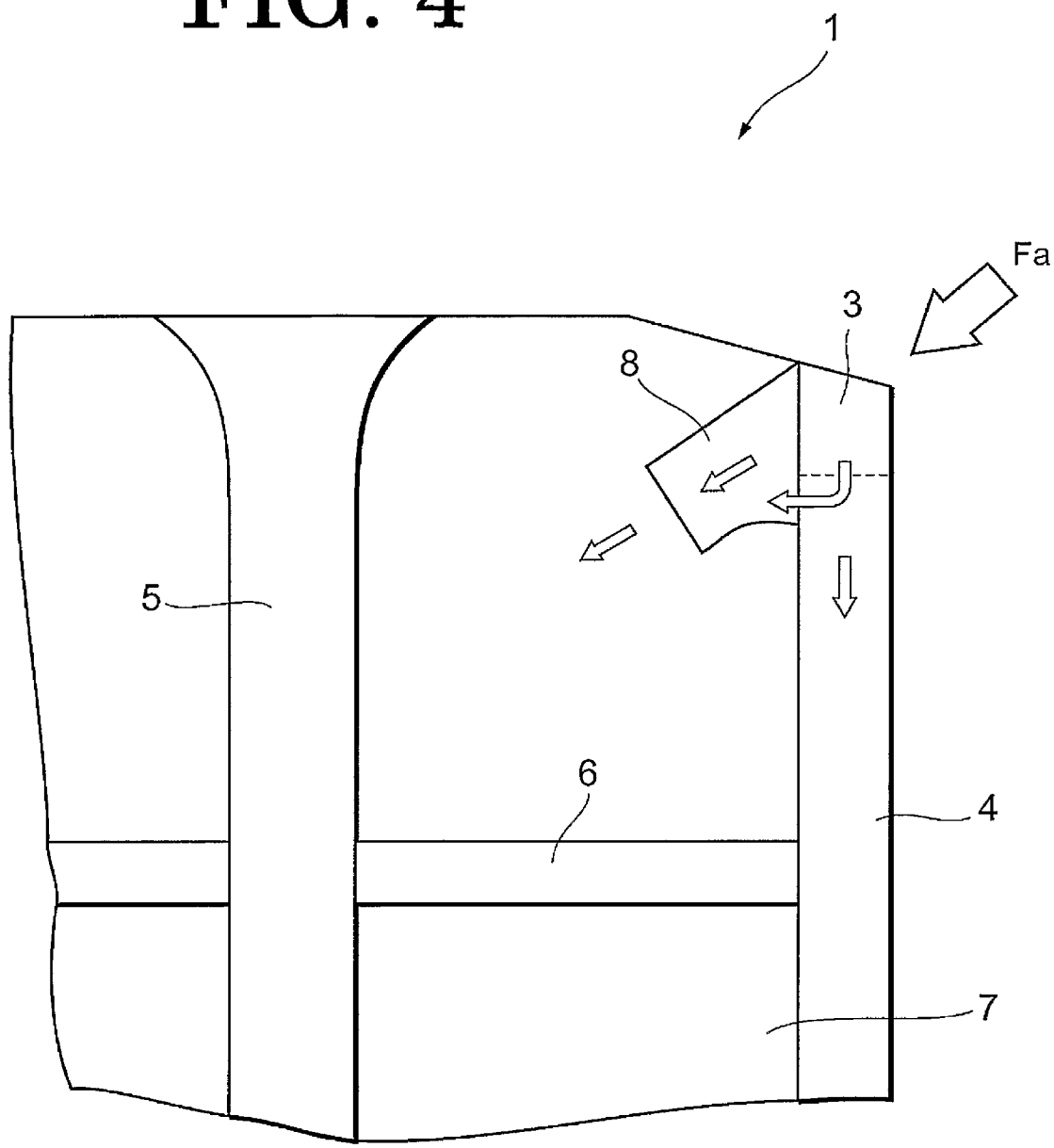
FIG. 4 is the plan view showing the manner in which the collision load is transferred in the vehicle lower body structure in FIG. 1.

Next, the effects produced by the thus configured vehicle lower body structure 1 will be described with reference to FIGS. 3A, 3B and 4. FIGS. 3A and 3B show the manner in which the collision load Fa is transferred, when the collision load Fa is applied to the windshield pillar 3 from a position above the rocker 4, viewed in the direction of the arrow in FIG. 1. In FIGS. 3A and 3B, the left side corresponds to the diagonally forward right side of the vehicle, and the right side corresponds to the diagonally rearward left side of the vehicle. FIG. 3A shows the case where the collision load Fa is applied to the windshield pillar 3 via a front tire of the host vehicle. FIG. 3B shows the case where the collision load Fa is applied to the windshield pillar 3 from another vehicle that collides with the upper portion of the front tire. FIG. 4 is the plan view showing the manner in which the collision load Fa is transferred when another vehicle collides with the host vehicle obliquely with respect to the line extending in the longitudinal direction of the host vehicle without involving a front side member (not shown), and the collision load Fa is applied to the windshield pillar 3 from a position above the rocker 4.

When an offset collision occurs between the host vehicle and another vehicle, the collision load Fa is applied to the windshield pillar 3 from a position above the rocker 4 and on the obliquely right front side of the vehicle, as shown in FIGS. 3A, 3B. At this time, the position from which the collision load Fa is applied to the windshield pillar 3 is above the centroid of the rocker 4. Accordingly, the bending moment Ma for bending the windshield pillar 3 toward the lateral center and the rear of the vehicle compartment is applied to the windshield pillar 3.

When the collision load Fa is applied to the windshield pillar 3, the pillar brace 8 receives the collision load Fa using a reaction force against the bending moment Ma applied to the windshield pillar 3, because the pillar brace 8 supports, at a position above the rocker 4, the windshield pillar 3. The collision load Fa is received by the pillar side-face connection portion 10a and the pillar rear-face connection portion 10b of the pillar brace 8. Therefore, the collision load Fa applied to the windshield pillar 3 is transferred to the floor panel 7 via the pillar brace 8 toward the lateral center and the rear of the vehicle to be dispersed.

Part of the collision load Fa applied to the windshield pillar 3 is transferred to the rocker 4. The collision load transferred to the rocker 4 is transferred from the rocker side-face connection portion 10c of the pillar brace 8 to the pillar brace 8, and then transferred via the pillar brace 8 to the floor panel 7 to be dispersed.

In a conventional vehicle lower body structure, which lacks a pillar brace, part of a collision load applied to a windshield pillar is transferred to the rocker. However, the collision load applied to the windshield pillar is not efficiently transferred to be dispersed, because there is no member that supports, at a position above the rocker, the windshield pillar. Accordingly, the bending moment applied to the windshield pillar is not reduced, and the amount by which the windshield pillar is bent in the vehicle compartment is not sufficiently reduced.

In contrast, with the described vehicle lower body structure 1, the collision load Fa, applied to the windshield pillar 3, is transferred to the floor panel 7 via the pillar brace 8. Thus, the bending moment Ma, applied to the windshield pillar 3, is reduced, and, consequently, the amount by which the windshield pillar 3 intrudes into the vehicle compartment is reduced.

With the vehicle lower body structure 1, the collision load Fa, applied to the windshield pillar 3, due to an offset collision, from a position above the rocker 4 is received by the pillar brace 8, and the received collision load Fa is transferred toward the lateral center and the rear of the vehicle compartment to be dispersed. As a result, deformation of the vehicle compartment in an offset collision is minimized.

In addition, the flange 10 of the pillar brace 8 is connected to the vehicle-compartment-side face and the rear-side face of the windshield pillar 3. Accordingly, it is possible to reliably receive the components in the collision load Fa applied to the windshield pillar 3, which are applied in the vehicle-width direction toward the lateral center of the vehicle and applied toward the rear of the vehicle.

Because the pillar brace 8 is connected to the rocker 4, the pillar brace 8 receives the collision load Fa transferred from the windshield pillar 3 to the rocker 4, and efficiently transfers the collision load Fa in the vehicle-width direction toward lateral center of the vehicle and toward the rear of the vehicle.

Figure 5:
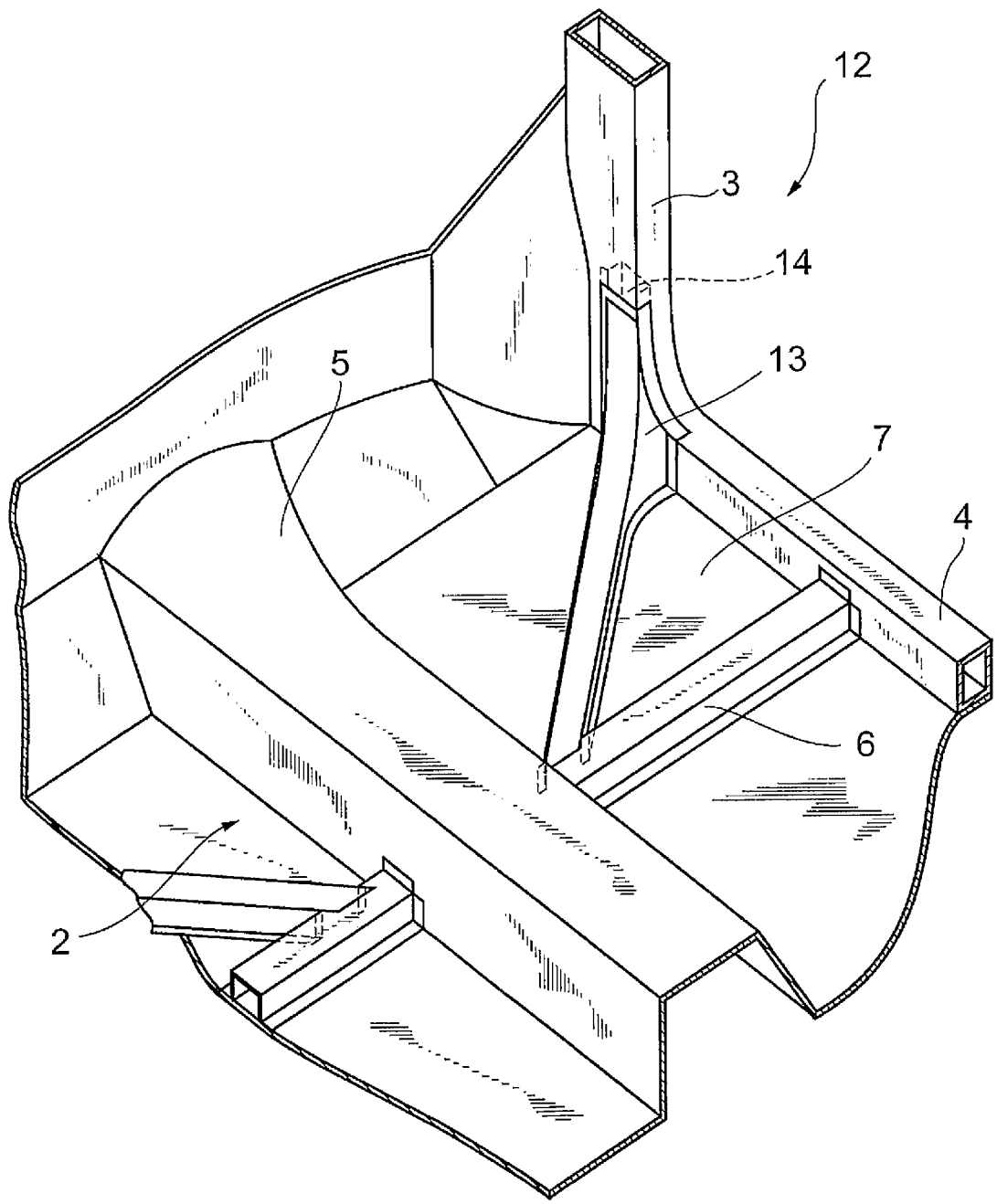
FIG. 5 is the perspective view showing a vehicle lower body structure according to a second embodiment of the invention.
Figure 6:
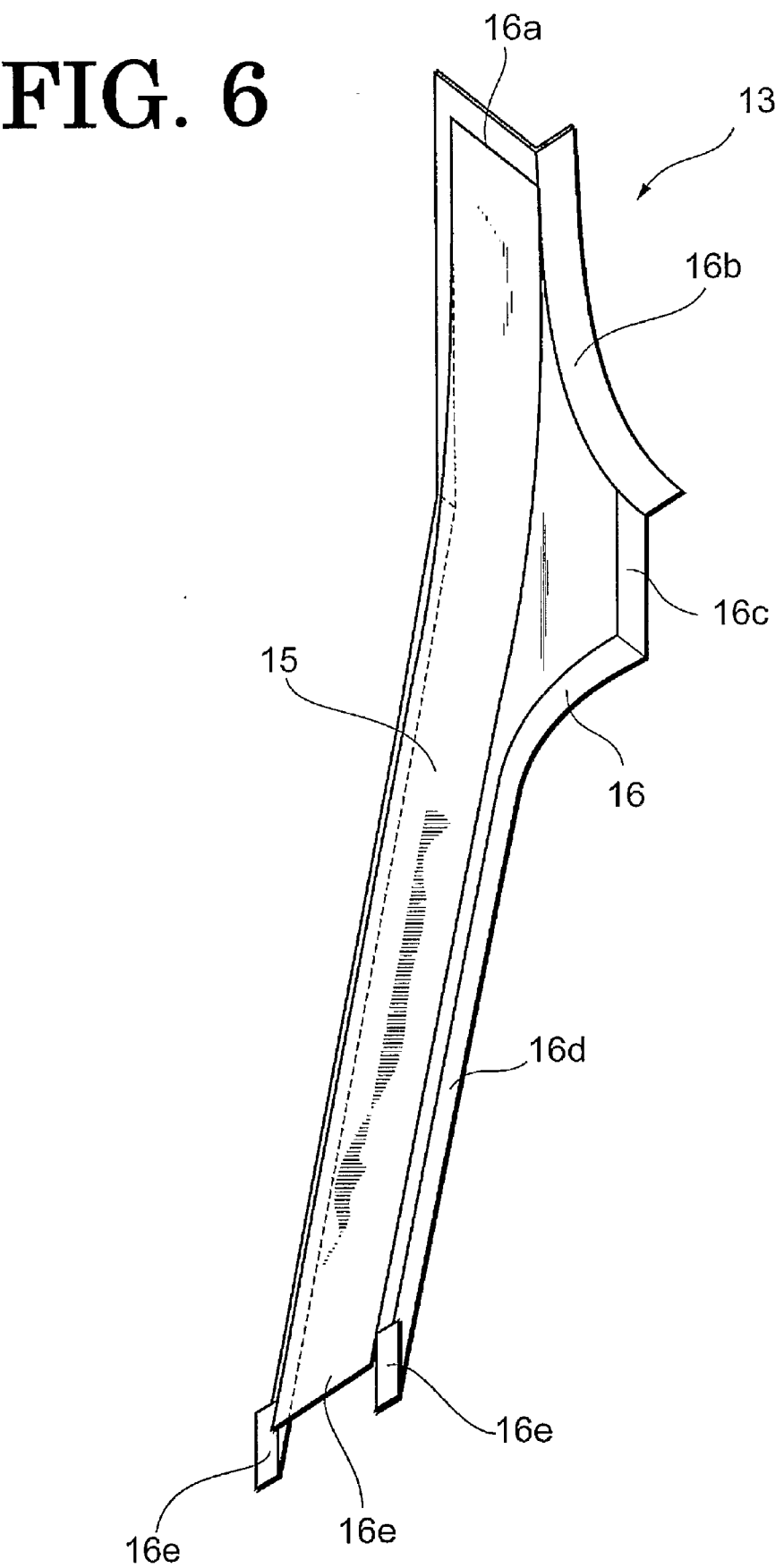
FIG. 6 is the perspective view showing a pillar brace in FIG. 5.
Figure 7:
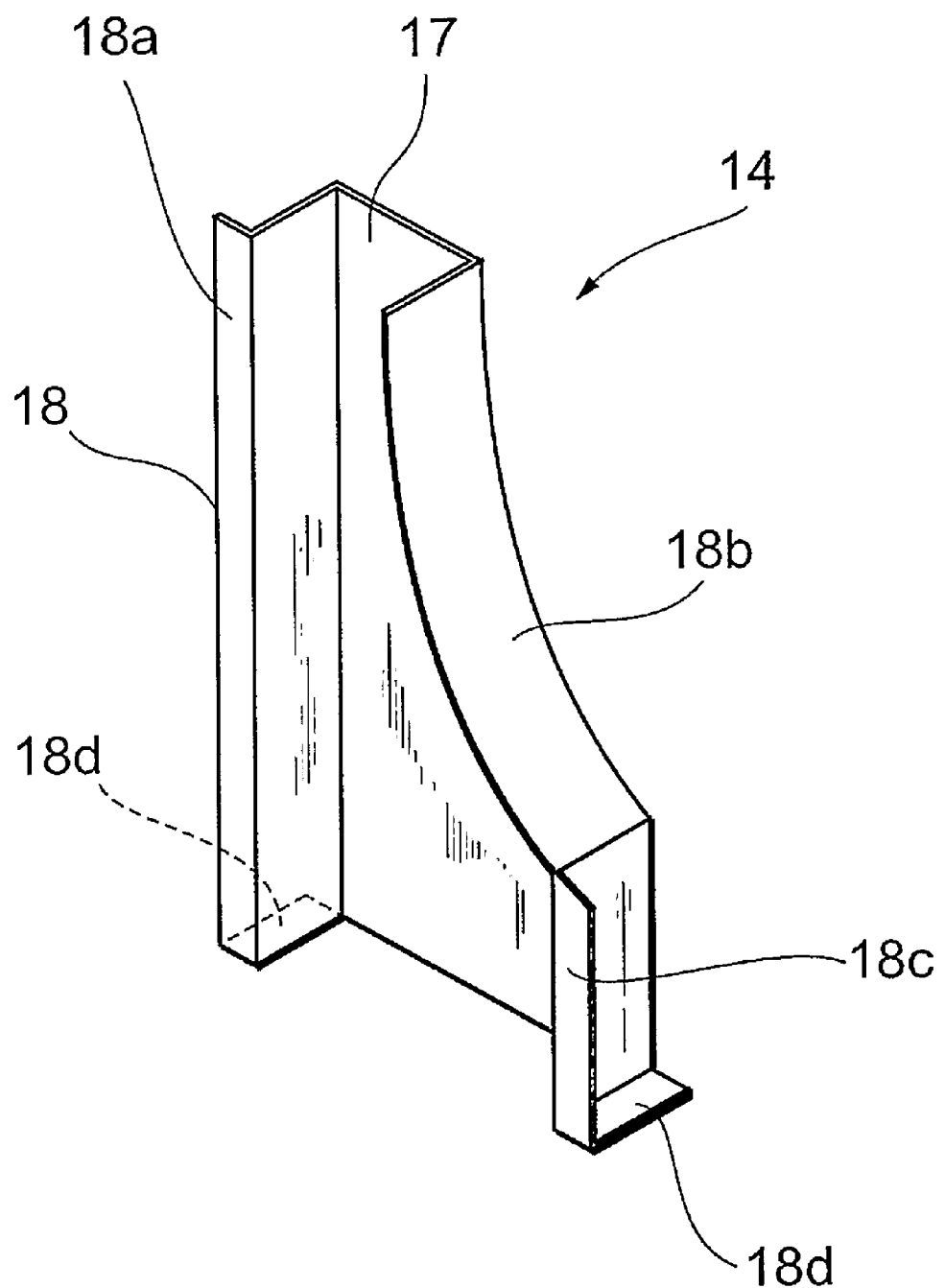
FIG. 7 is the perspective view showing a bulkhead in FIG. 5.
Figure 8:
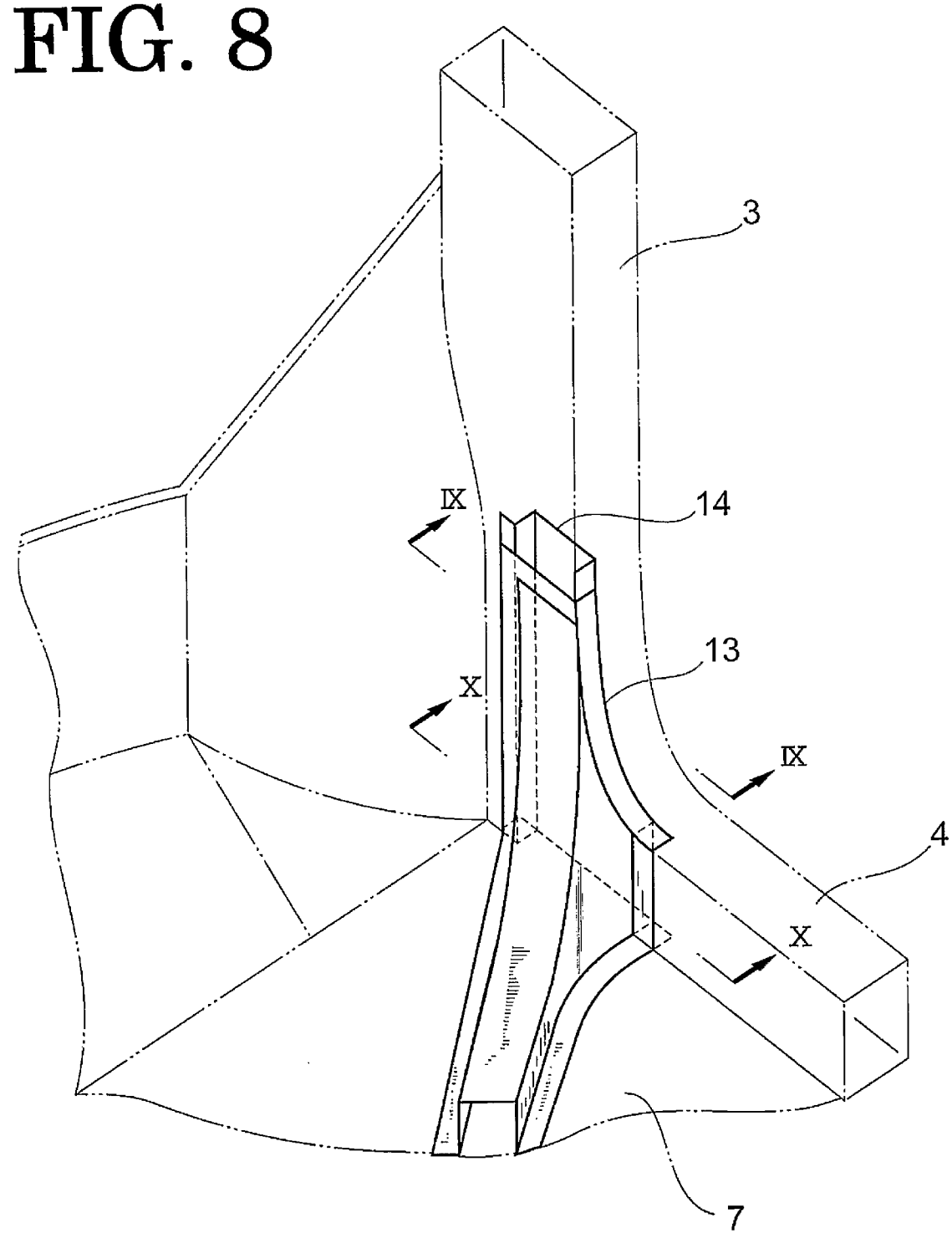
FIG. 8 is the perspective view showing the manner in which the pillar brace and the bulkhead are connected to each other.
Figure 9:
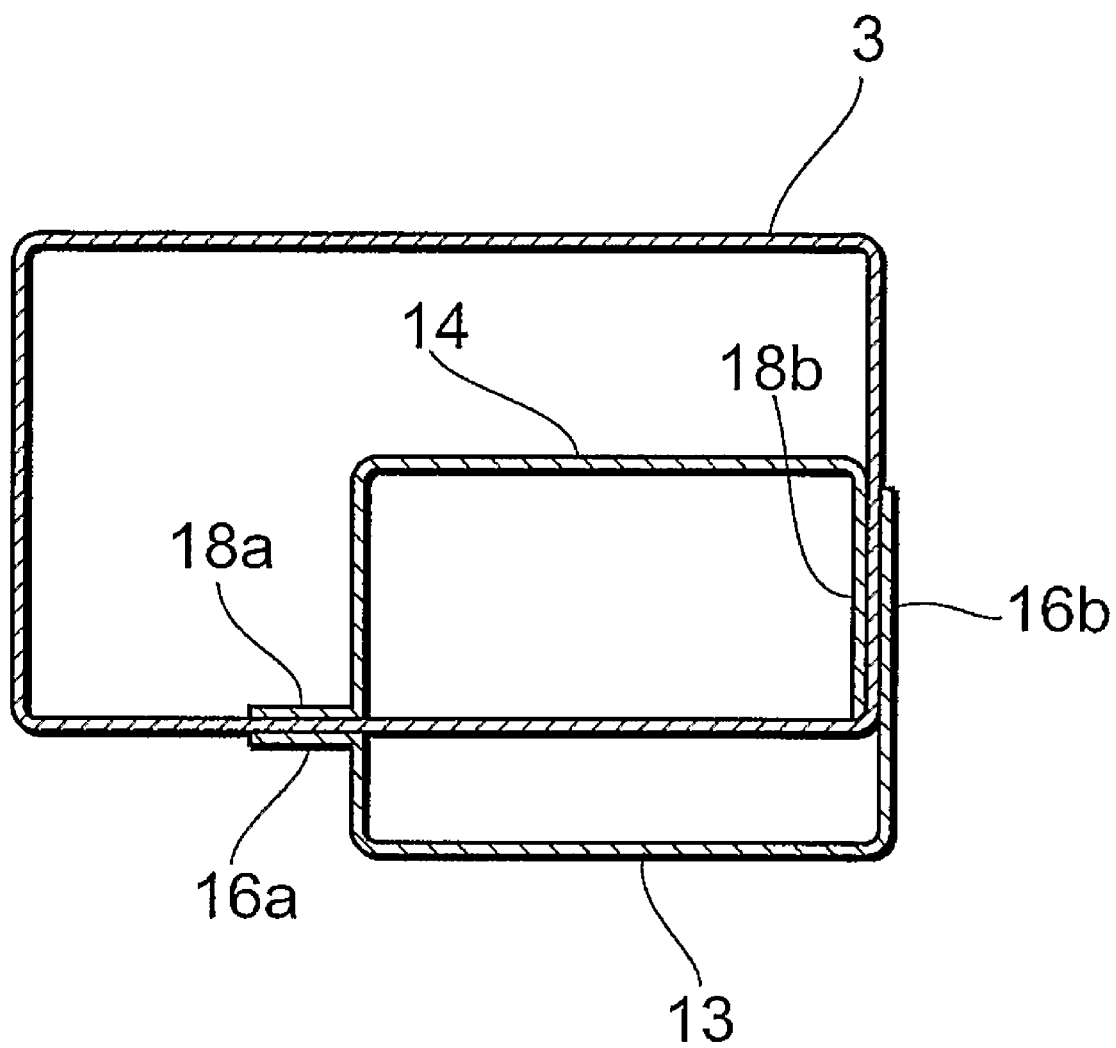
FIG. 9 is the cross-sectional view taken along line IX-IX in FIG. 8.
Figure 10:
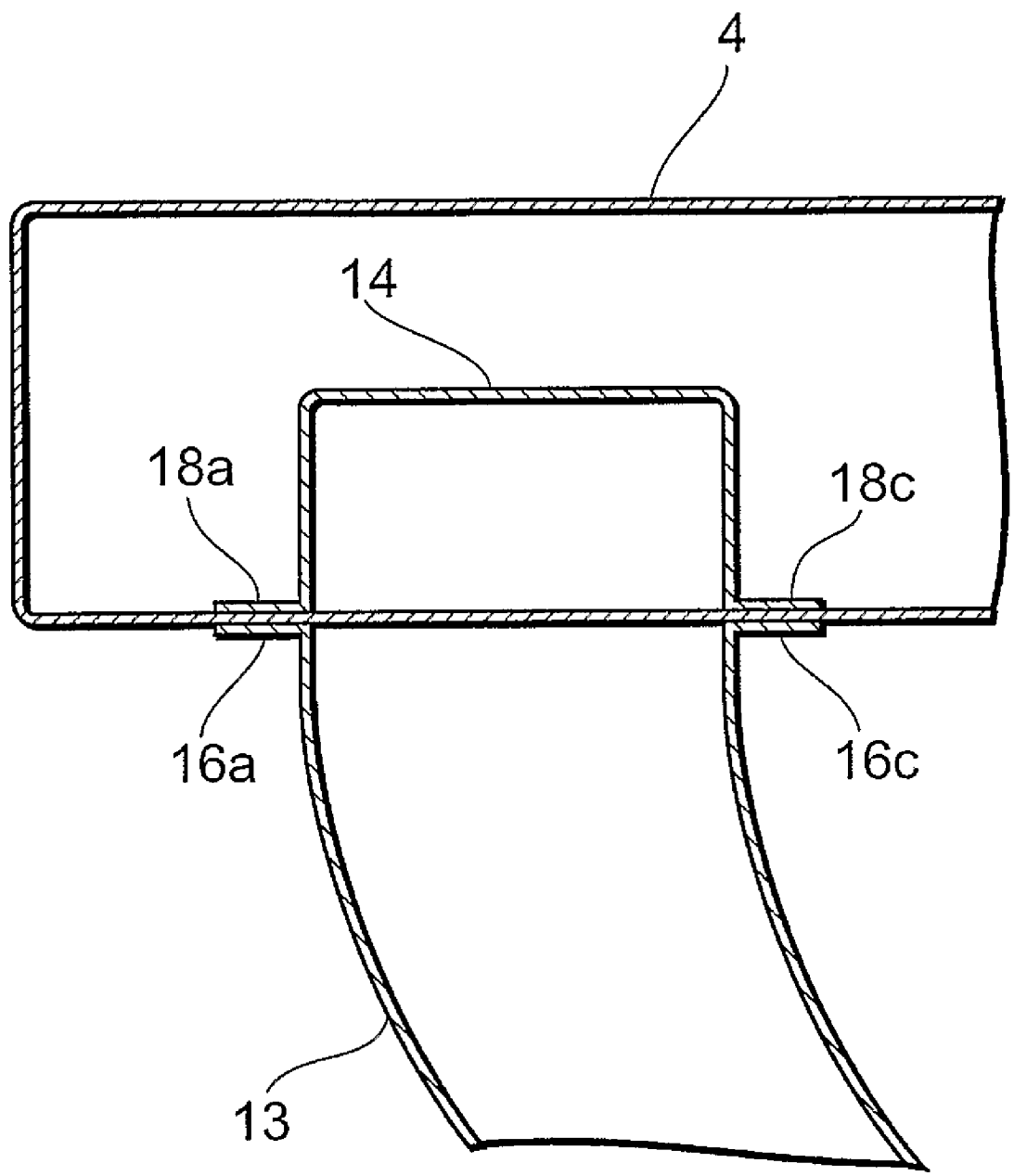
FIG. 10 is the cross-sectional view taken along line X-X in FIG. 8.

Next, a vehicle lower body structure 12 according to a second embodiment of the invention will be described with reference to FIGS. 5 to 10. FIG. 5 is the perspective view showing the vehicle lower body structure 12 according the second embodiment of the invention. FIG. 6 is the perspective view showing a pillar brace 13 in the vehicle lower body structure 12. FIG. 7 is the perspective view showing a bulkhead 14 in the vehicle lower body structure 12. FIG. 8 is the perspective view showing the manner in which the pillar brace 13 and the bulkhead 14 are connected to each other. FIG. 9 is the cross-sectional view taken along line IX-IX in FIG. 8. FIG. 10 is the cross-sectional view taken along line X-X in FIG. 8.

The vehicle lower body structure 12 according to the second embodiment differs from the vehicle lower body structure 1 according to the first embodiment in that the pillar brace 13 is connected to the floor cross-member 6 as well as the windshield pillar 3, the rocker 4, the floor panel 7; and the bulkhead 14 is arranged in the windshield pillar 3 and the rocker 4.

One end of the pillar brace 13 is connected to the windshield pillar 3. The position at which the pillar brace 13 is connected to the windshield pillar 3 is above the rocker 4. The pillar brace 13 extends from the windshield pillar 3 toward the lateral center and the rear of the vehicle compartment. The other end of the pillar brace 13 is connected to the floor cross-member 6. Therefore, the pillar brace 13 serves as a reinforcement member that supports the windshield pillar 3 from the inside of the vehicle. In addition, the pillar brace 13 is connected to the floor cross-member 6, whereby the vehicle lower body structure 12 forms a truss structure.

As shown in FIG. 6, the pillar brace 13 includes a body portion 15 that forms the body of the pillar brace 13, and a flange 16 that is connected to the windshield pillar 3, the rocker 4, the floor panel 7, and the floor cross-member 6. The flange 16 of the pillar brace 13 includes a pillar side-face connection portion 16a that is connected to the vehicle-compartment-side outer face of the windshield pillar 3, the pillar rear-face connection portion 16b that is connected to the face that extends from the rear-side outer face of the windshield pillar 3 to the outer top-face of the rocker 4, a rocker side-face connection portion 16c that is connected to the vehicle-compartment-side outer face of the rocker 4, a floor panel connection portion 16d that is connected to the floor panel 7, and a floor cross-member connection portion 16e that is connected to the floor cross-member 6. The pillar brace 13 may be connected to the windshield pillar 3, the rocker 4, the floor panel 7, and the floor cross-member 6 by welding or with bolts, etc.

The bulkhead 14 is a reinforcement member used to efficiently transfer the collision load Fa, applied to the windshield pillar 3, to the pillar brace 13. As shown in FIG. 7, the bulkhead 14 includes a body portion 17 that forms the body of the bulkhead 14, and a flange 18 that is connected to the windshield pillar 3 and the rocker 4. The flange 18 of the bulkhead 14 includes a pillar inner-side-face connection portion 18a that is connected to the vehicle-compartment-side inner face of the windshield pillar 3, a pillar inner-rear-face connection portion 18b that is connected to the face that extends from the rear-side inner face of the windshield pillar 3 to the inner top-face of the rocker 4, a rocker inner-side-face connection portion 18c that is connected to the vehicle-compartment-side inner face of the rocker 4, and a rocker bottom-face connection portion 18d that is connected to the inner bottom-face of the rocker 4.

As shown in FIGS. 8 to 10, the bulkhead 14 is arranged in the windshield pillar 3 and the rocker 4 at a position corresponding to the pillar brace 13. Namely, the pillar side-face connection portion 16a of the pillar brace 13 is attached to the outer faces of the windshield pillar 3 and the rocker 4 and the pillar inner-side-face connection portion 18a of the bulkhead 14 is attached to the inner faces of the windshield pillar 3 and the rocker 4 so that the pillar side-face connection portion 16a and the pillar inner-side-face connection portion 18a face each other with the windshield pillar 3 and the rocker 4 interposed between the pillar side-face connection portion 16a and the pillar inner-side-face connection portion 18a. The pillar rear-face connection portion 16b of the pillar brace 13 is attached to the face that extends from the rear-side outer face of the windshield pillar 3 to the outer top-face of the rocker 4 and the pillar inner-rear-face connection portion 18b of the bulkhead 14 is attached to the face that extends from the rear-side inner face of the windshield pillar 3 to the inner top-face of the rocker 4 so that the pillar rear-face connection portion 16b and the pillar inner-rear-face connection portion 18b face each other with the windshield pillar 3 and the rocker 4 interposed between the pillar rear-face connection portion 16b and the pillar inner-rear-face connection portion 18b. The rocker side-face connection portion 16c of the pillar brace 13 is attached to the vehicle-compartment-side outer face of the rocker 4 and the rocker inner-side-face connection portion 18c of the bulkhead 14 is attached to the vehicle-compartment-side inner face of the rocker 4 so that the rocker side-face connection portion 16c and the rocker inner-side-face connection portion 18c face each other with the rocker 4 interposed between the rocker side-face connection portion 16c and the rocker inner-side-face connection portion 18c. At the upper portion of the bulkhead 14, the bulkhead 14 and the pillar brace 13 face each other to form a closed cross section, as shown in FIG. 9. At the lower portion of the bulkhead 14, the bulkhead 14 and the pillar brace 14 face each other, as shown in FIG. 10.

Figure 11:
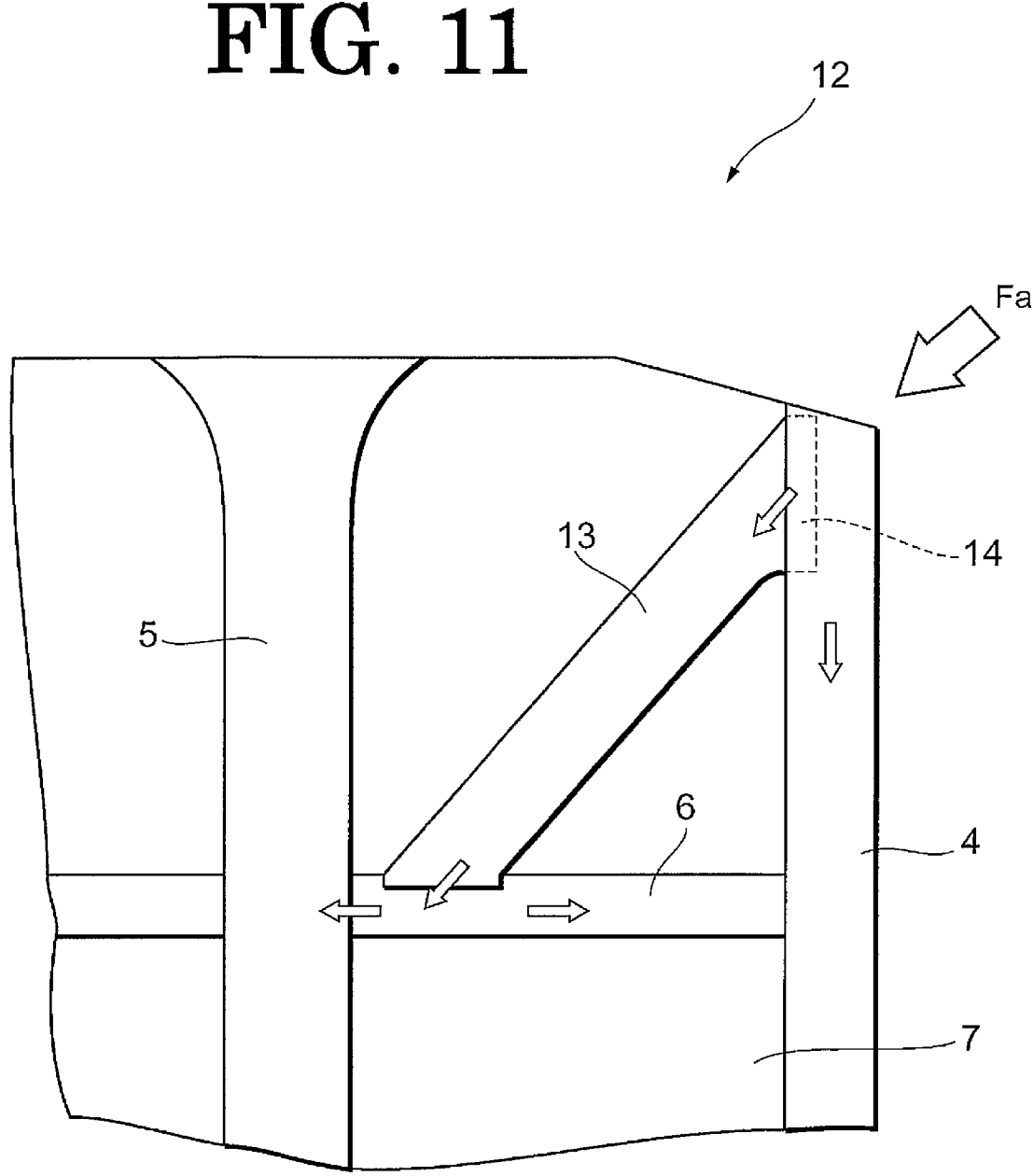
FIG. 11 is the plan view showing the manner in which the collision load is transferred in the vehicle lower body structure in FIG. 5.

Next, the effects produced by the thus configured vehicle lower body structure 12 will be described with reference to FIG. 11. FIG. 11 is the plan view showing the manner in which the collision load Fa is transferred, when another vehicle collides with the host vehicle obliquely with respect to the longitudinal axis of the host vehicle without involving the front-side member (not shown), and the collision load Fa is applied to the windshield pillar 3 from a position above the rocker 4.

As shown in FIG. 11, when the collision load Fa is applied to the windshield pillar 3 from a position above the rocker 4 toward the lateral center and the rear of the vehicle compartment, the collision load Fa is applied also to the bulkhead 14 attached to the inner faces of the windshield pillar 3 and the rocker 4. Then, the collision load Fa applied to the windshield pillar 3 and the bulkhead 14 is transferred to the pillar brace 13.

The collision load Fa transferred to the pillar brace 13 is transferred to the floor cross-member 6 toward the lateral center and the rear of the vehicle to be dispersed. The collision load Fa transferred to the floor cross-member 6 is transferred to the floor tunnel member 5 in the vehicle-width direction toward lateral center and also to the rocker 4 in the vehicle-width direction toward the outside to be dispersed.

In the vehicle lower body structure 12, the end portion of the pillar brace 13 that extends toward the lateral center and the rear of the vehicle compartment is connected to the floor cross-member 6, which extends in the vehicle-width direction. Thus, the strength with which the windshield pillar 3 is supported is increased, and the collision load Fa, applied to the windshield pillar from a position above the rocker 4, is transferred directly to the floor cross-member 6 toward the lateral center and the rear of the vehicle via the pillar brace 13 to be dispersed. Then, the collision load Fa transferred to the floor cross 6 is transferred to the floor tunnel member 5 and the rocker 4 to be dispersed. As a result, the bending moment Ma applied to the windshield pillar 3 is reduced, and, consequently, the amount by which the windshield pillar 3 is bent in the vehicle compartment is reduced. Thus, deformation of the vehicle compartment due, for example, to an offset collision is reduced.

The pillar brace 13 is connected to the windshield pillar 3 and the floor cross-member 6, whereby the windshield pillar 3, the pillar brace 13, the floor cross-member 6, the rocker 4, and the floor tunnel member 5 form a truss structure. Accordingly, the force with which the pillar brace 13 supports the windshield pillar 3 increases.

The bulkhead 14 is arranged in the windshield pillar 3 at a position corresponding to the pillar brace 13. Thus, the efficiency of transferring the collision load Fa from the windshield pillar 3 to the pillar brace 13 is enhanced. The pillar brace 13 and the bulkhead 14 form a closed cross section with the windshield pillar 3 interposed between the pillar brace 13 and the bulkhead 14, whereby the collision load Fa applied to the bulkhead 14 via the pillar brace 13 is transferred directly to the pillar brace 13. Accordingly, the efficiency of transferring the collision load Fa from the windshield pillar 3 to the pillar brace 13 is drastically enhanced.

Figure 12:
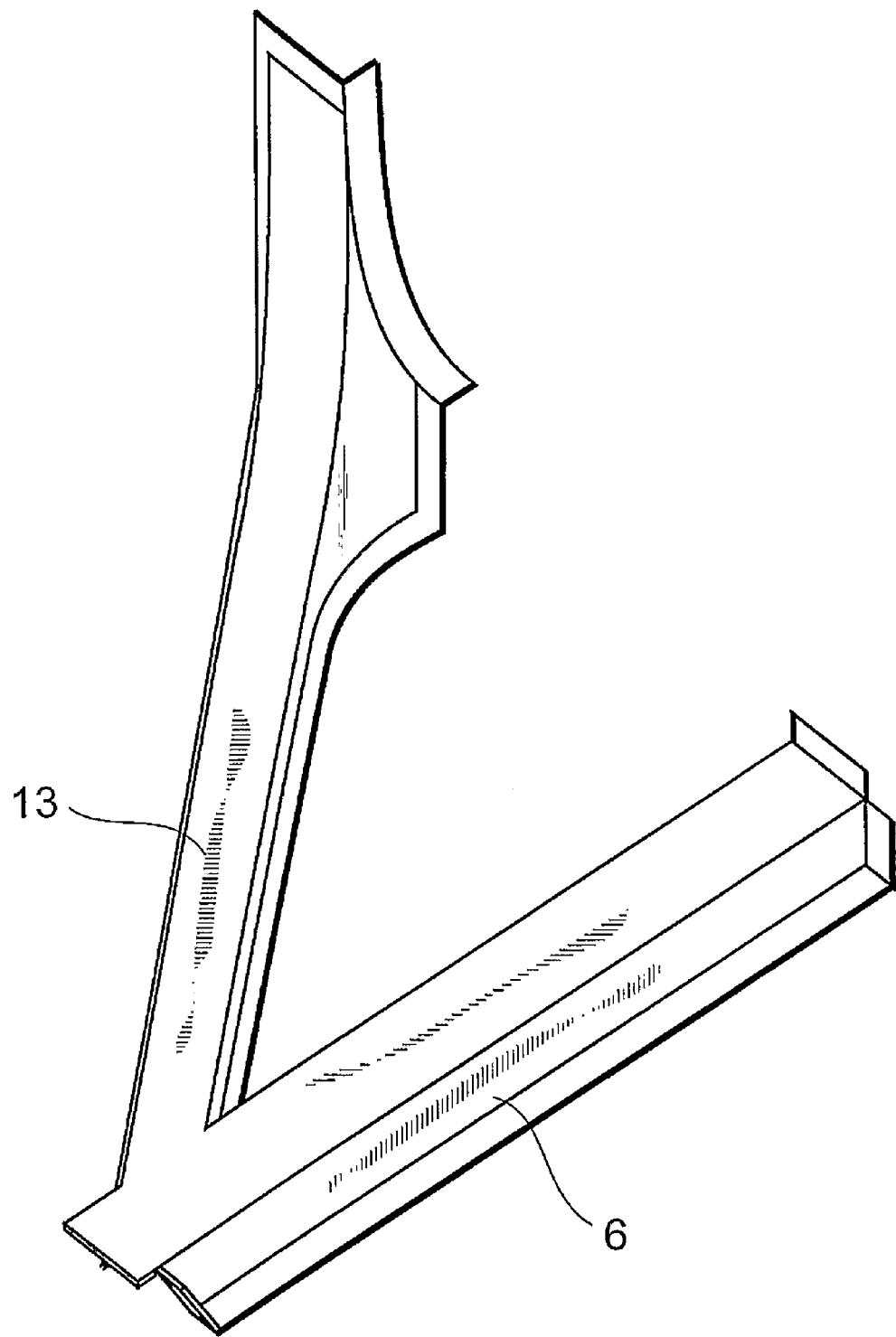
FIG. 12 is the perspective view showing a modified example of the pillar brace in FIG. 5.

As shown in FIG. 12, the pillar brace 13 and the floor cross-member 6 may be formed integrally with each other. Thus, it is not necessary to connect the pillar brace 13 and the floor cross-member 6 to each other. As a result, production time and production cost are reduced.

Figure 13:
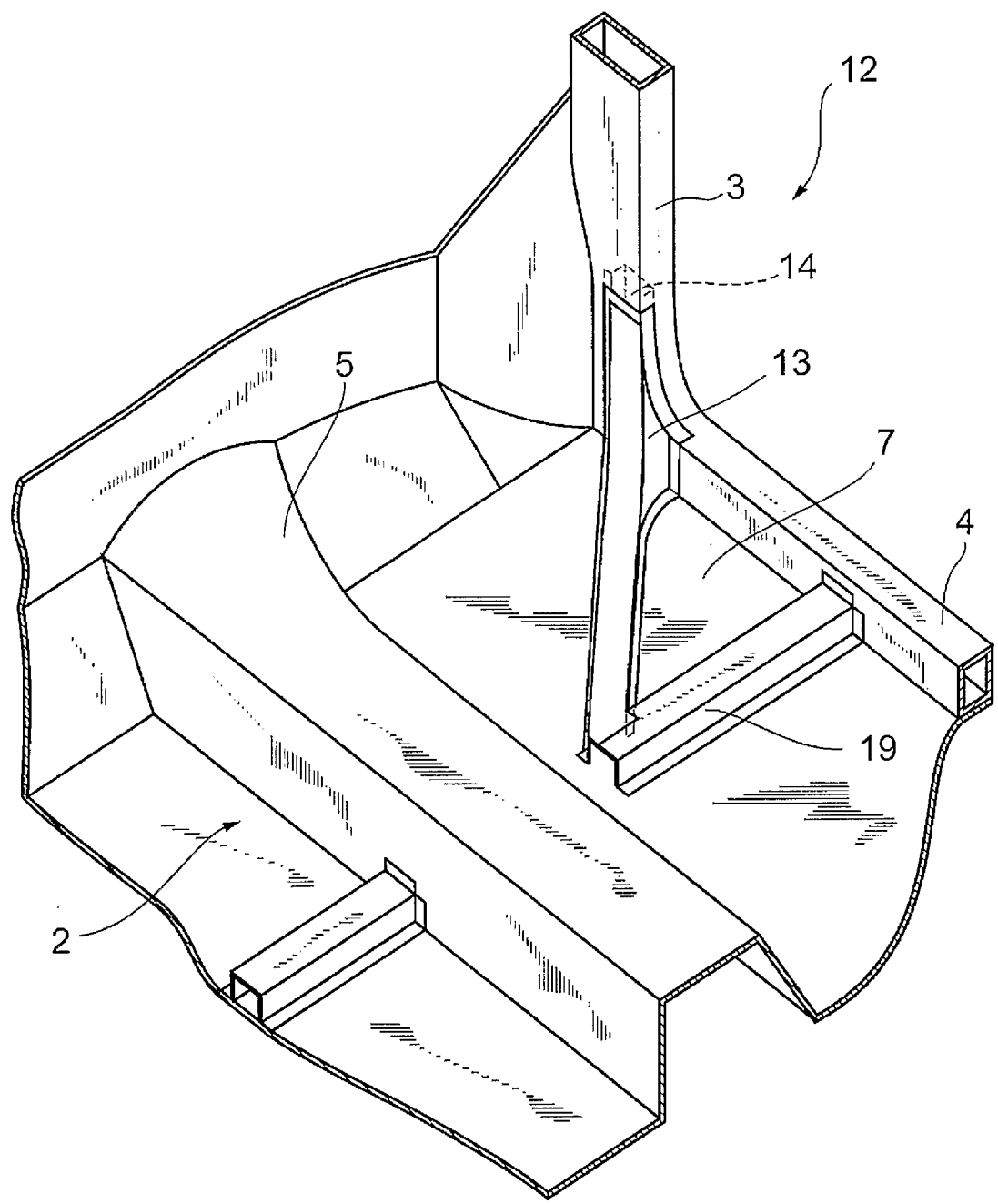
FIG. 13 is the perspective view showing a modified example of a floor cross-member in FIG. 5.

As shown in FIG. 13, the floor cross-member 6 need not be the floor tunnel member 5. With the structure shown in FIG. 13 in which the pillar brace 13 is connected to a floor cross-member 19 that is connected to the rocker 4 and extends in the vehicle-width direction, the collision load Fa applied to the pillar brace 13 is transferred to the floor cross-member 19 to be dispersed.

Figure 14:
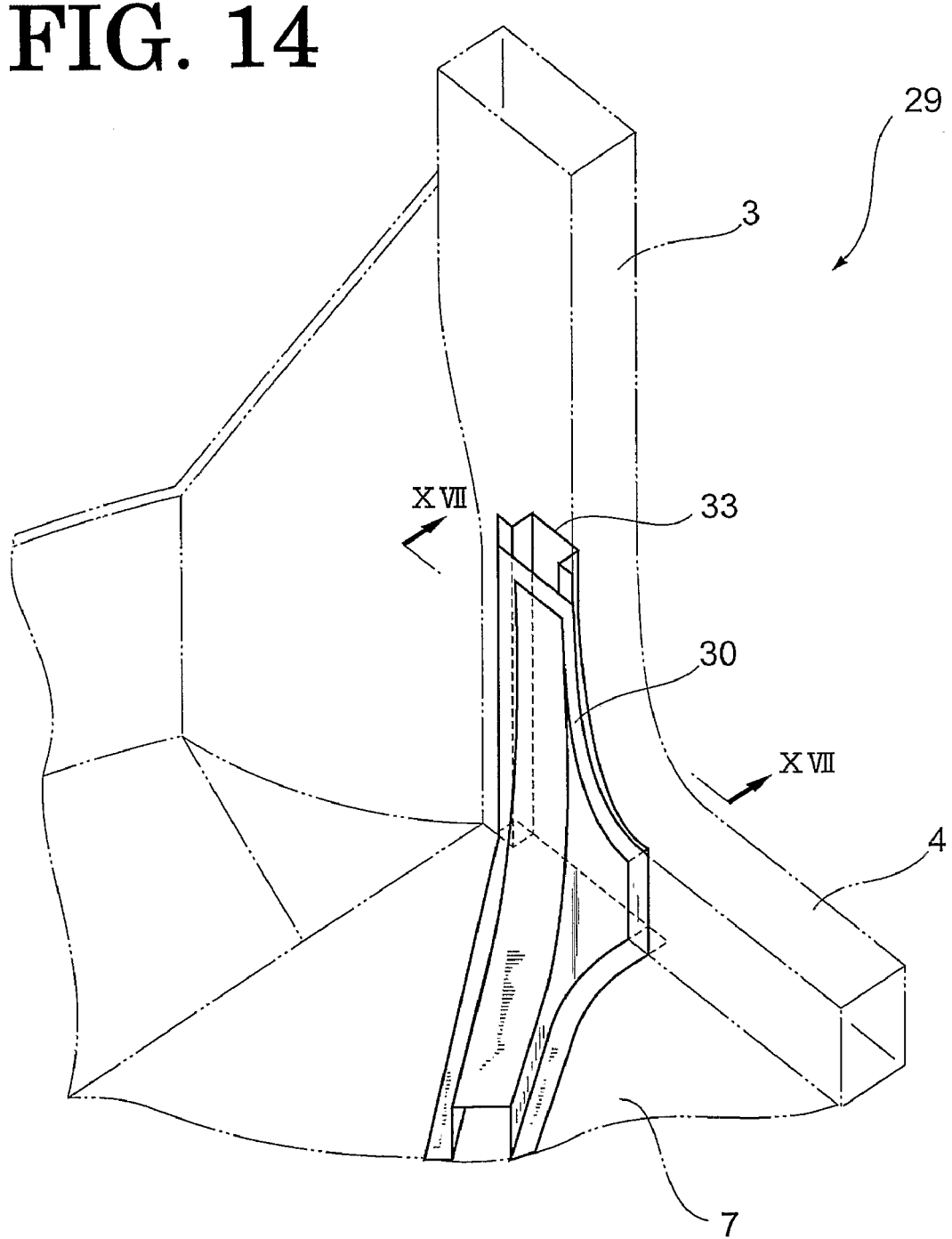
FIG. 14 is the perspective view showing the manner in which a pillar brace and a bulkhead are connected to each other in a vehicle lower body structure according to a third embodiment of the invention.
Figure 15:
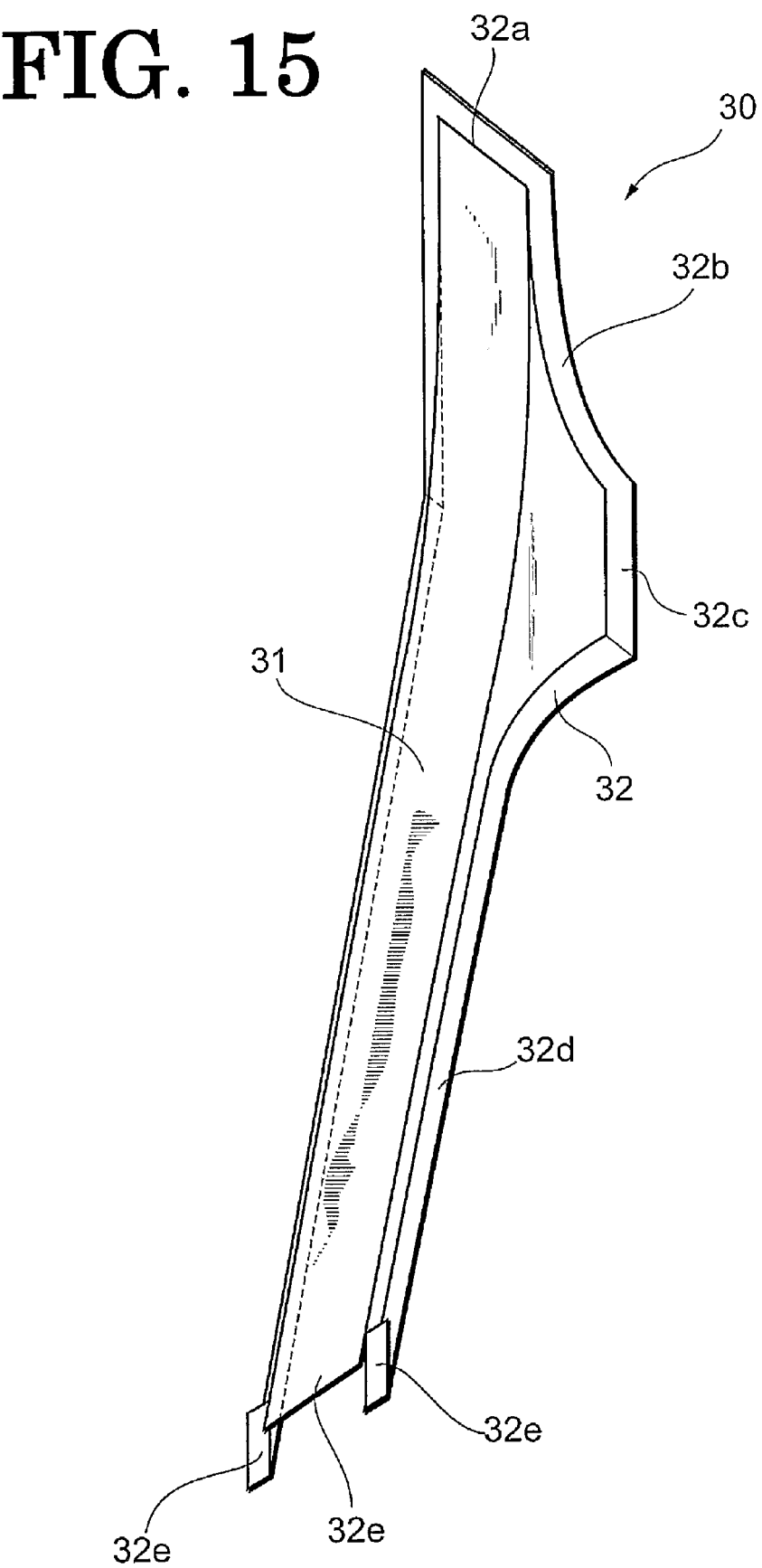
FIG. 15 is the perspective view showing a pillar brace in FIG. 14.
Figure 16:
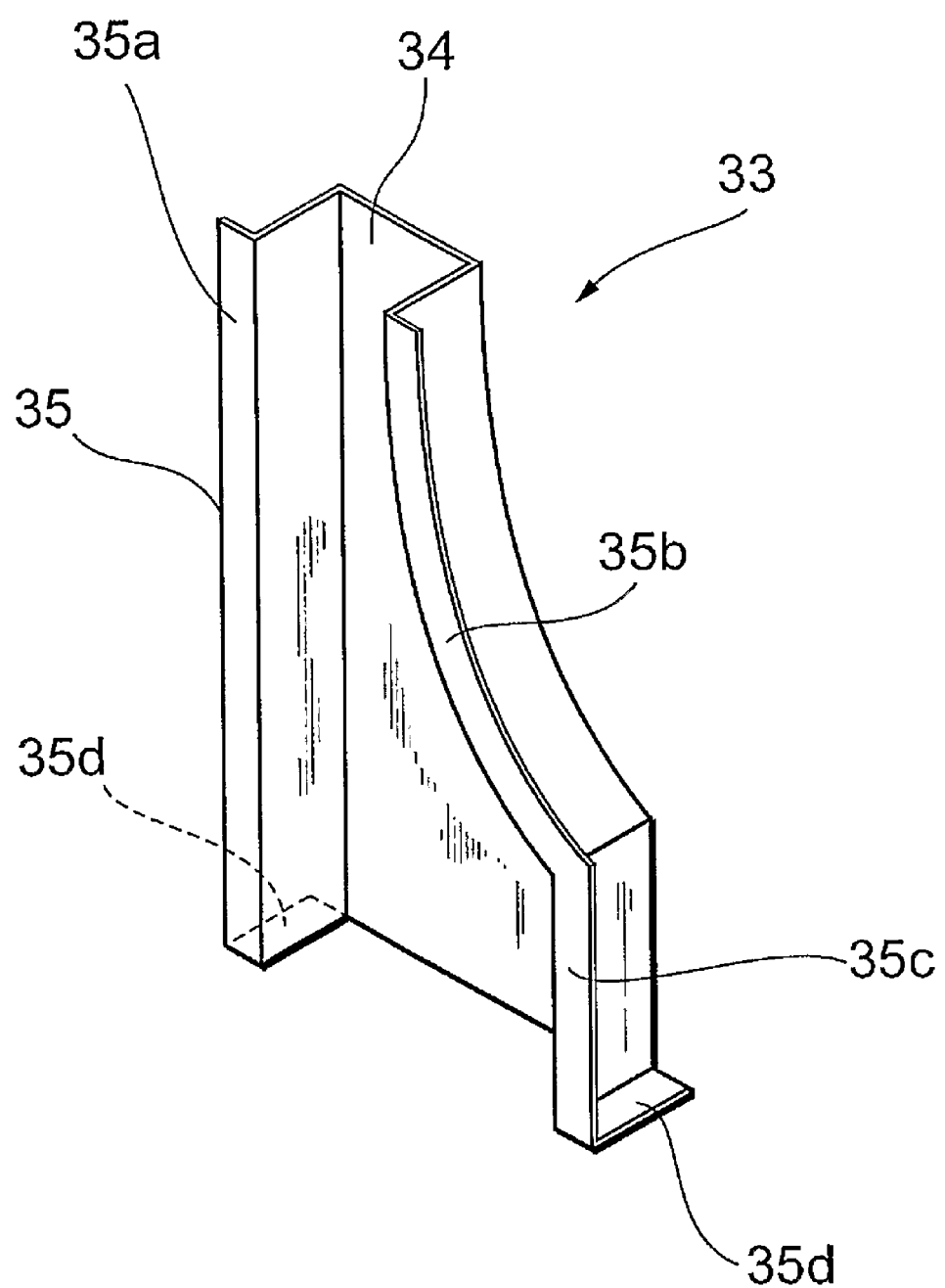
FIG. 16 is the perspective view showing a bulkhead in FIG. 14.
Figure 17:
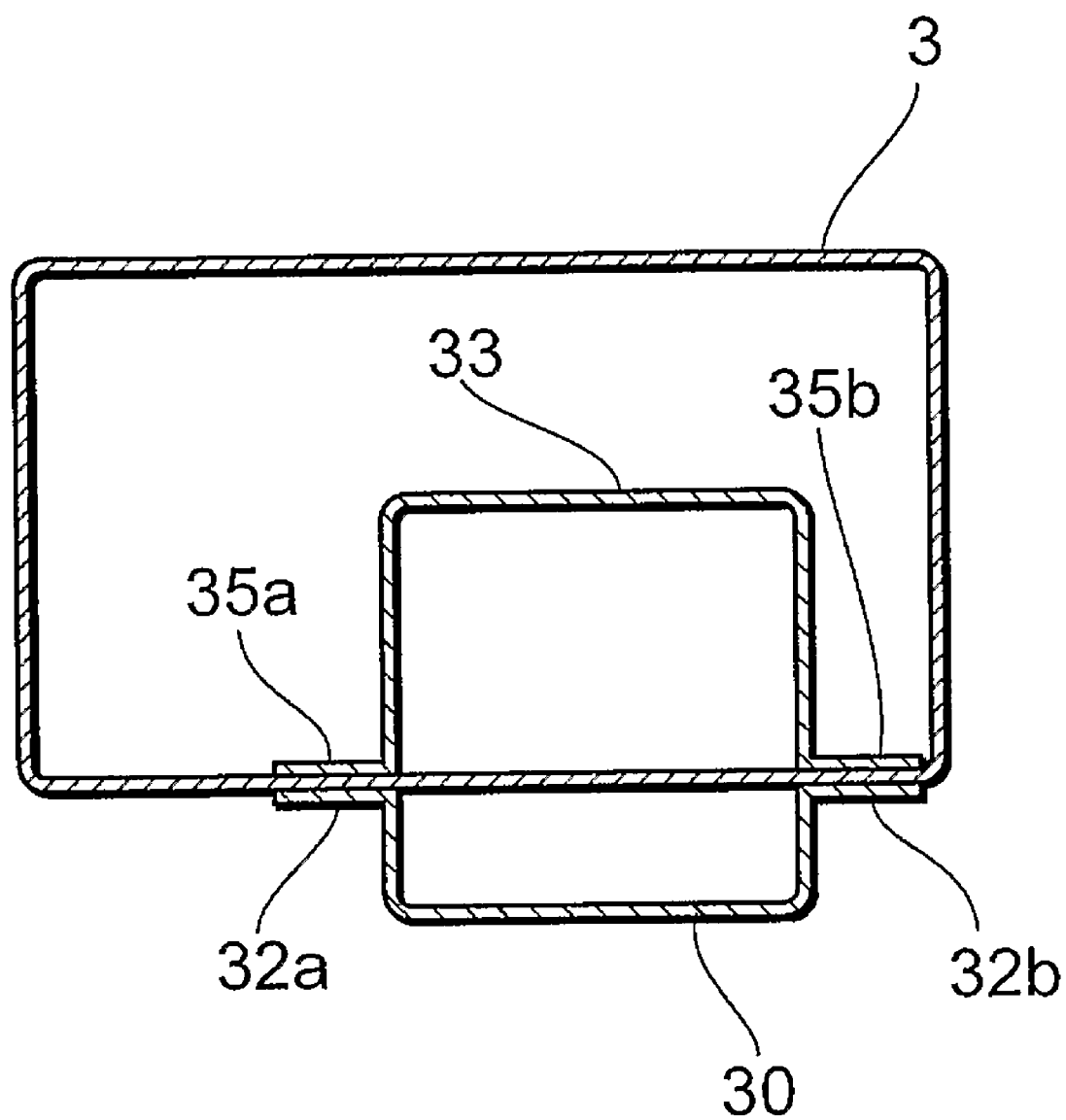
FIG. 17 is the cross-sectional view taken along line XVII-XVII in FIG. 14.

Next, a vehicle lower body structure 29 according to a third embodiment of the invention will be described with reference to FIG. 14. FIG. 14 is the perspective view showing the manner in which a pillar brace 30 and a bulkhead 33 are connected to each other in the vehicle lower body structure 29 according to the third embodiment of the invention. FIG. 15 is the perspective view showing the pillar brace 30 in the vehicle lower body structure 29. FIG. 16 is the perspective view showing the bulkhead 33 in the vehicle lower body structure 29. FIG. 17 is the cross-sectional view taken along line XVII-XVII in FIG. 14.

As shown in FIG. 14, the vehicle lower body structure 29 according to the third embodiment differs from the vehicle lower body structure 12 according to the second embodiment in that the pillar brace 30, which is realized by changing the shape of the flange 16 of the pillar brace 13, and a bulkhead 33, which is realized by changing the shape of the flange 18 of the bulkhead 14, are provided.

As shown in FIG. 15, the pillar brace 30 includes a body portion 31 that forms the body of the pillar brace 30, and a flange 32 that is connected to the windshield pillar 3, the rocker 4, the floor panel 7, and the floor cross-member 6. The flange 32 of the pillar brace 30 includes a pillar side-face connection portion 32a that is connected to the vehicle-compartment-side outer face of the windshield pillar 3, a pillar side-face connection portion 32b that is connected to the face that extends from the vehicle-compartment-side outer face of the windshield pillar 3 to the vehicle-compartment-side outer face of the rocker 4, a rocker side-face connection portion 32c that is connected to the vehicle-compartment-side outer face of the rocker 4, a floor panel connection portion 32d that is connected to the floor panel 7, and a floor cross-member connection portion 32e that is connected to the floor cross-member 6.

As shown in FIG. 16, the bulkhead 33 includes a body portion 34 that forms the body of the bulkhead 33, and a flange 35 that is connected to the windshield pillar 3 and the rocker 4. The flange 35 of the bulkhead 33 includes a pillar inner-side-face connection portion 35a that is connected to the vehicle-compartment-side inner face of the windshield pillar 3, a pillar inner-side-face connection portion 35b that is connected to the face that extends from the vehicle-compartment-side inner face of the windshield pillar 3 to the vehicle-compartment-side inner face of the rocker 4, a rocker inner-side-face connection portion 35c that is connected to the vehicle-compartment-side inner face of the rocker 4, and a rocker inner-bottom-face connection portion 35d that is connected to the inner bottom-face of the rocker 4.

The bulkhead 33 is arranged in the windshield pillar 3 and the rocker 4 at a position corresponding to the pillar brace 30. Namely, the pillar side-face connection portion 32a of the pillar brace 30 is attached to the outer faces of the windshield pillar 3 and the rocker 4 and the pillar inner-side-face connection portion 35a of the bulkhead 33 is attached to the inner faces of the windshield pillar 3 and the rocker 4 so that the pillar side-face connection portion 32a and the pillar inner-side-face connection portion 35a face each other with the windshield pillar 3 and the rocker 4 interposed therebetween. The pillar side-face connection portion 32b of the pillar brace 30 is attached to the face that extends from the vehicle-compartment-side outer face of the windshield pillar 3 to the vehicle-compartment-side outer face of the rocker 4 and the pillar inner-side-face connection portion 35b of the bulkhead 33 is attached to the face that extends from the vehicle-compartment-side inner face of the windshield pillar 3 to the vehicle-compartment-side inner face of the rocker 4 so that the pillar side-face connection portion 32b and the pillar inner-side-face connection portion 35b face each other with the windshield pillar 3 and the rocker 4 interposed between the pillar side-face connection portion 32b and the pillar inner-side-face connection portion 35b. The rocker side-face connection portion 32c of the pillar brace 30 is attached to the vehicle-compartment-side outer face of the rocker 4 and the rocker inner-side-face connection portion 35c of the bulkhead 14 is attached to the vehicle-compartment-side inner face of the rocker 4 so that the rocker side-face connection portion 32c and the rocker inner-side-face connection portion 35c face each other with the rocker 4 interposed between the rocker side-face connection portion 32c and the rocker inner-side-face connection portion 35c. At the upper portion of the bulkhead 14, the bulkhead 33 and the pillar brace 30 face each other to form a closed cross section, as shown in FIG. 17.

With the thus configured vehicle lower body structure 29, it is possible to easily process the flange 32, because pillar brace 30 is connected to the windshield pillar 3 only at the vehicle-compartment-side outer face of the windshield pillar 3.

Also, providing the bulkhead 33 in the windshield pillar 3 at the position corresponding to the pillar brace 30 enhances the efficiency of transferring the collision load Fa from the windshield pillar 3 to the pillar brace 30. In addition, forming the closed cross section by the pillar brace 30 and the bulkhead 33 with the windshield pillar 3 interposed therebetween makes it possible to transfer the collision load Fa applied to the bulkhead 33 via the pillar brace 30 directly to the pillar brace 30. Accordingly, the efficiency of transferring the collision load Fa from the windshield pillar 3 to the pillar brace 30 is drastically enhanced.

The pillar brace 30 need not extend to the floor cross-member 6. For example, as in the case of the pillar brace 8 in the vehicle lower body structure 1 according to the first embodiment of the invention, the pillar brace 30 may be a short member that is connected to the windshield pillar 3, the rocker 4 and the floor panel 7. More specifically, in the pillar brace 30 may be formed by providing the pillar side-face connection portion 32b shown in FIG. 15, instead of the pillar rear-face connection portion 10b, to the pillar brace 8 shown in FIG. 2.

Figure 18:
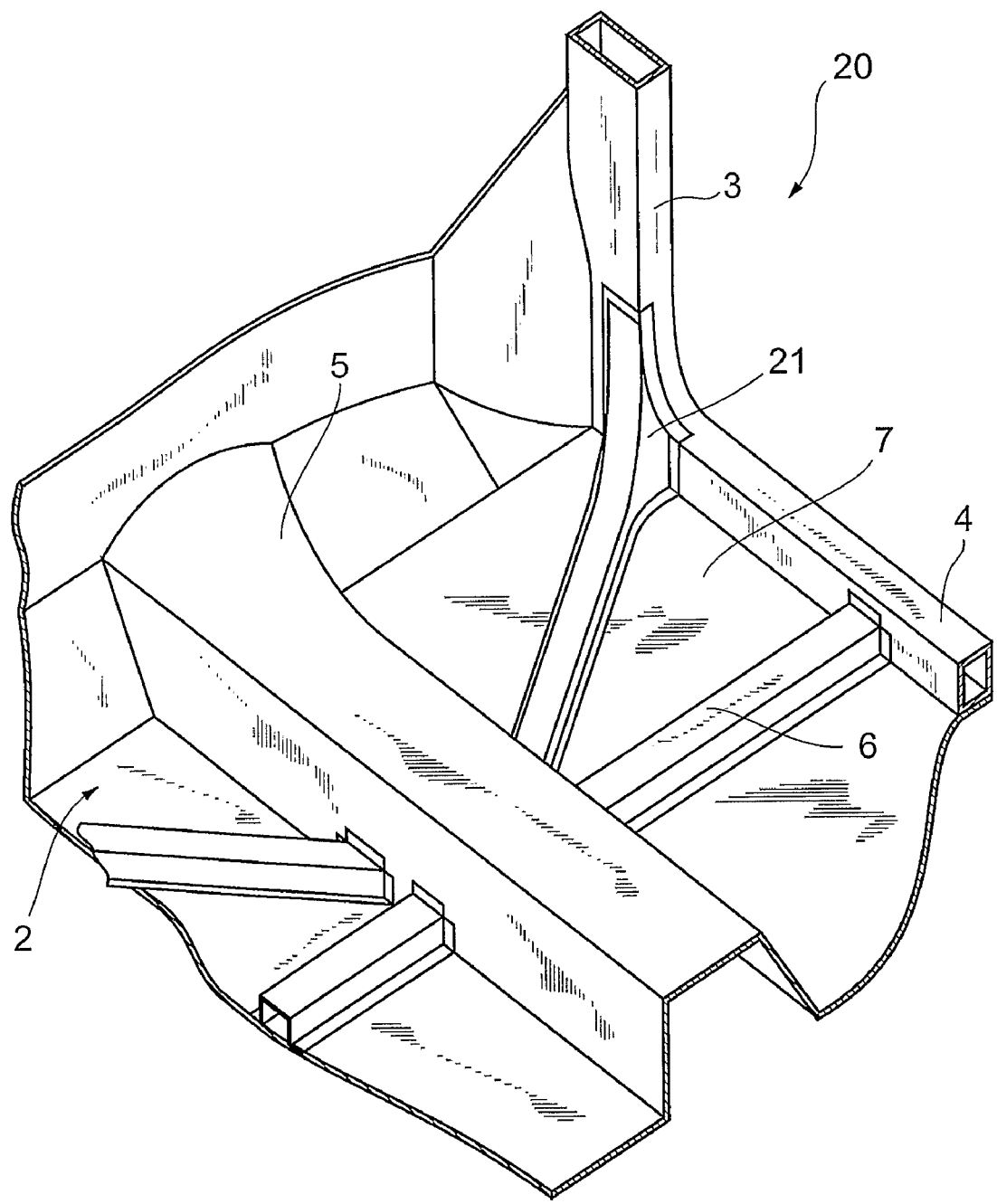
FIG. 18 is the perspective view showing a vehicle lower body structure according to a fourth embodiment of the invention.

Next, a vehicle lower body structure 20 according to a fourth embodiment of the invention will be described in detail with reference to FIG. 18. FIG. 18 is the perspective view showing the vehicle lower body structure 20 according to the fourth embodiment of the invention.

As shown in FIG. 18, the vehicle lower body structure 20 according to the fourth embodiment differs from the vehicle lower body structure 12 according to the second embodiment in that a pillar brace 21 connected to the windshield pillar 3, the rocker 4, the floor panel 7 and the floor tunnel member 5.

One end of the pillar brace 21 is connected to the windshield pillar 3. The position at which the pillar brace 21 is connected to the windshield pillar 3 is above the rocker. The pillar brace 21 extends from the windshield pillar 3 toward the lateral center and the rear of the vehicle compartment, and the other end is connected to the floor tunnel member 5. Accordingly, the pillar brace 21 serves as a reinforcement member that supports the windshield pillar 3 from the inside of the vehicle.

Figure 19:
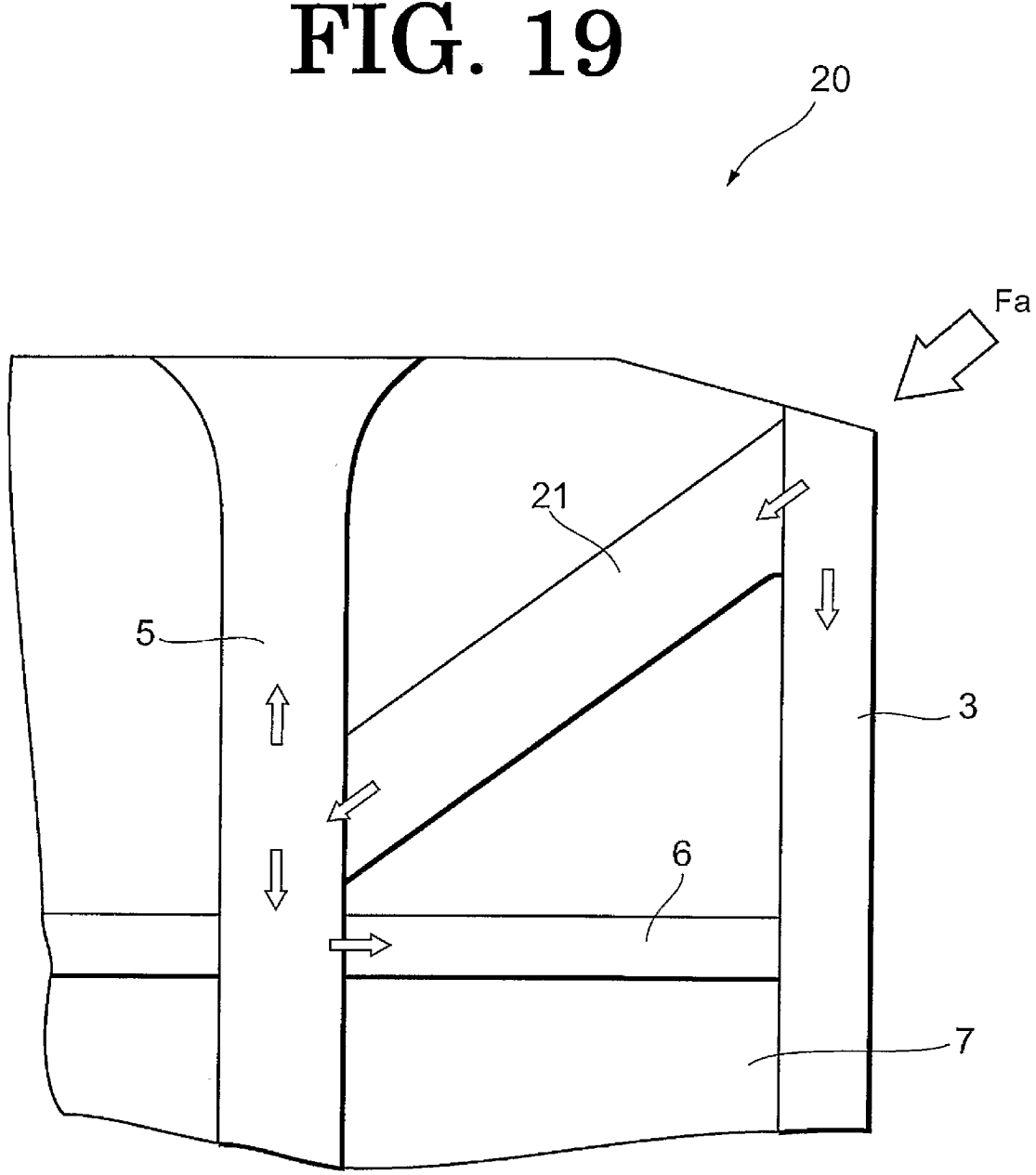
FIG. 19 is the plan view showing the manner in which the collision load is transferred in the vehicle lower body structure in FIG. 18.

FIG. 19 is the plan view showing the manner in which the collision load Fa is transferred, when another vehicle collides with the host vehicle obliquely with respect to the longitudinal axis of the host vehicle without involving the front side member (not shown) and the collision load Fa is applied to the windshield pillar 3 from a position above the rocker 4. As shown in FIG. 19, when the collision load Fa is applied to the windshield pillar 3 from a position above the rocker 4 toward the lateral center and the rear of the vehicle compartment, the collision load Fa is transferred to the pillar brace 21. The collision load Fa transferred to the pillar brace 21 is transferred to the floor tunnel member 5 serving as the center frame member to be dispersed. The collision load Fa applied to the floor tunnel member 5 is transferred to the floor cross-member 6 in the vehicle-width direction toward the outside to be dispersed.

The end portion of the pillar brace 21 that extends toward the lateral center and the rear of the vehicle compartment is connected to the floor tunnel member 5 that is arranged at the lateral center portion of the vehicle and that extends in the longitudinal direction of the vehicle, whereby a collision load Fa applied to the windshield pillar 3 from a position above the rocker 4 is transferred directly to the floor tunnel member 5 serving as the center frame member of the vehicle via the pillar brace 21 to be dispersed. Because the floor tunnel member 5 is arranged at the lateral center portion of the vehicle and extends in the longitudinal direction of the vehicle, many frame members (not shown) of the vehicle are connected to the floor tunnel member 5. Therefore, transferring the collision load Fa to the floor tunnel member 5 makes it possible to transfer the collision load Fa to more pieces of the frame members to be dispersed. Thus, the strength with which the windshield pillar is supported is enhanced and, consequently, deformation of the vehicle compartment due to an offset collision is reduced.

Figure 20:
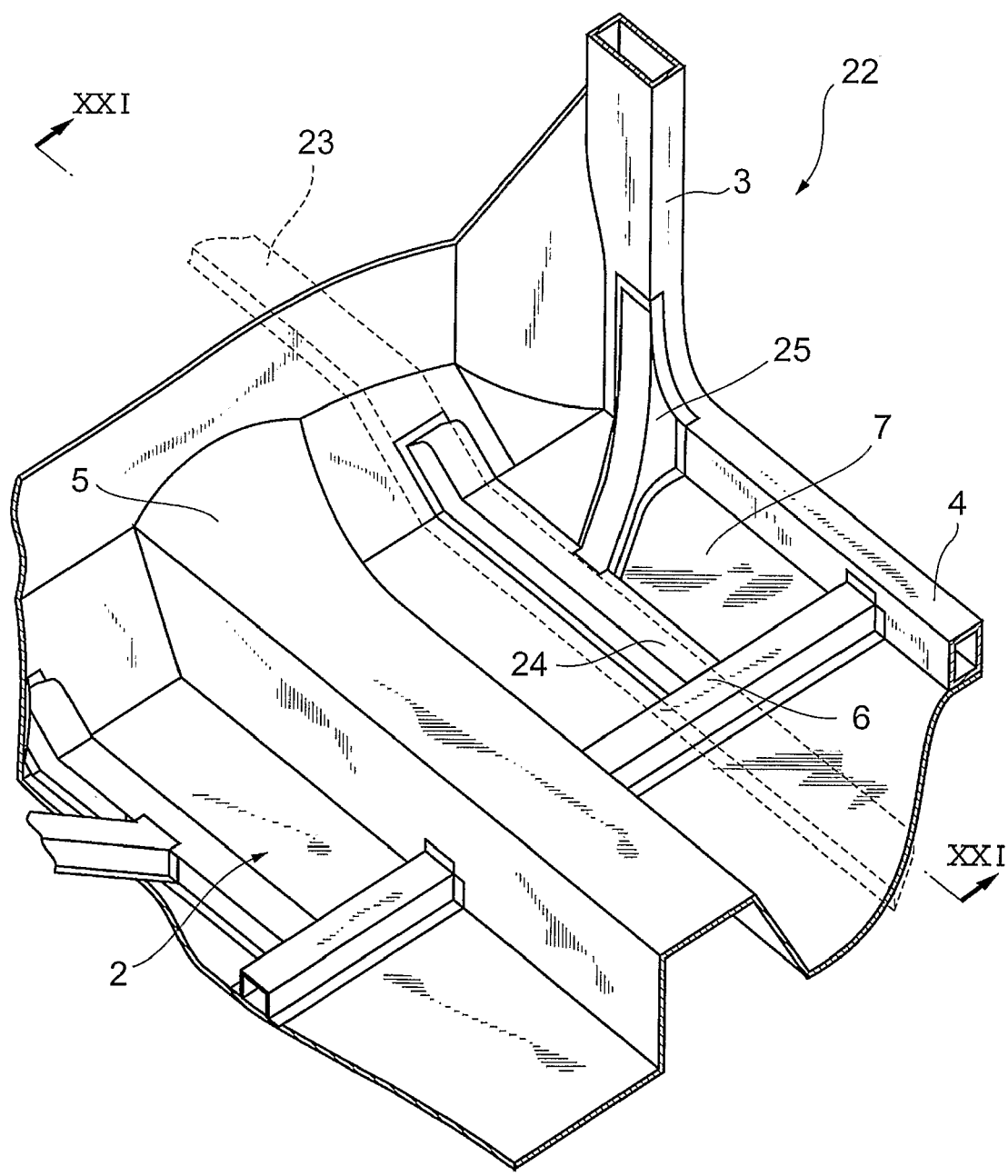
FIG. 20 is the perspective view showing a vehicle lower body structure according to a fifth embodiment of the invention.
Figure 21:
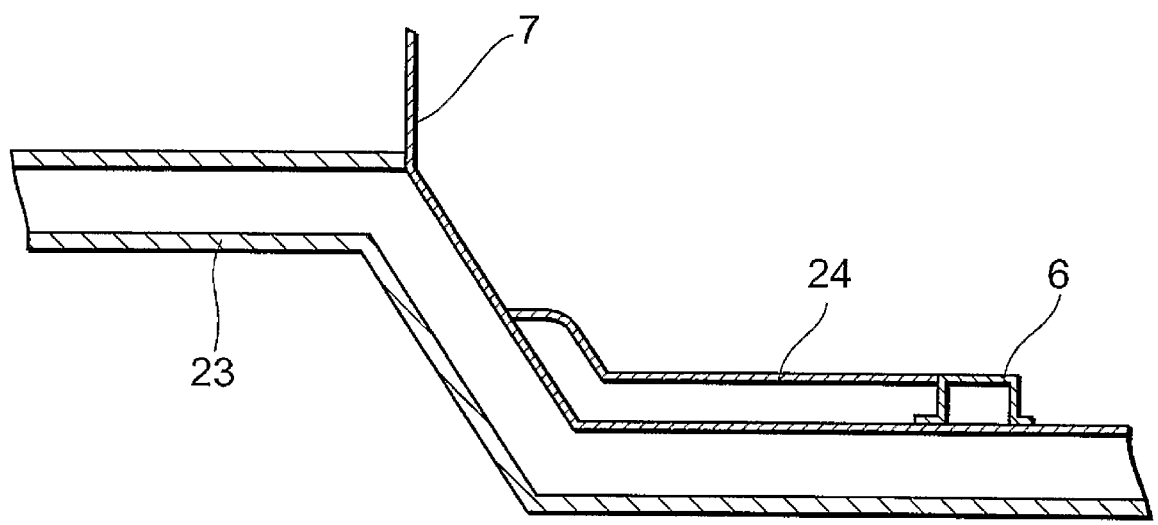
FIG. 21 is the cross-sectional view taken along line XXI-XXI in FIG. 20.

Next, a vehicle lower body structure 22 according to a fifth embodiment of the invention will be described with reference to FIGS. 20 and 21. FIG. 20 is the perspective view showing the vehicle lower body structure 22 according to the fifth embodiment of the invention. FIG. 21 is the cross-sectional view taken along line XXI-XXI in FIG. 20.

The vehicle lower body structure 22 according to the fifth embodiment differs from the vehicle lower body structure 20 according to the fourth embodiment in that a side member 23 and an floorpan reinforcement member 24 are provided between the rocker 4 and the floor tunnel member 5. The side member 23 is arranged under the floor panel 7 and extends in the longitudinal direction of the vehicle. The floorpan reinforcement member 24 extends in the longitudinal direction of the vehicle so as to face the side member 23 with the floor panel 7 interposed between the floorpan reinforcement member 24 and the side member 23, and is connected, at the rear end, to the floor cross-member 6. The vehicle lower portion structure 22 further differs from the vehicle lower body structure 20 in that the pillar brace 25 is connected to the windshield pillar 3, the rocker 4, the floor panel 7, and the floorpan reinforcement member 24.

The side member 23 and the floorpan reinforcement member 24 are arranged so as to face each other with the floor panel 7 interposed therebetween. The side member 23 and the floorpan reinforcement member 24 correspond to a vehicle floor assembly described in claims.

The pillar brace 25 is connected, at an end, to the windshield pillar 3. The position at which the pillar brace 25 is connected to the windshield pillar 3 is above the rocker 4. The pillar brace 25 extends from the windshield pillar 3 toward the lateral center and the rear of the vehicle compartment, and is connected, at the other end, to the floorpan reinforcement member 24. Therefore, the pillar brace 25 serves as a reinforcement member that supports the windshield pillar 3 from the inside of the vehicle.

Figure 22:
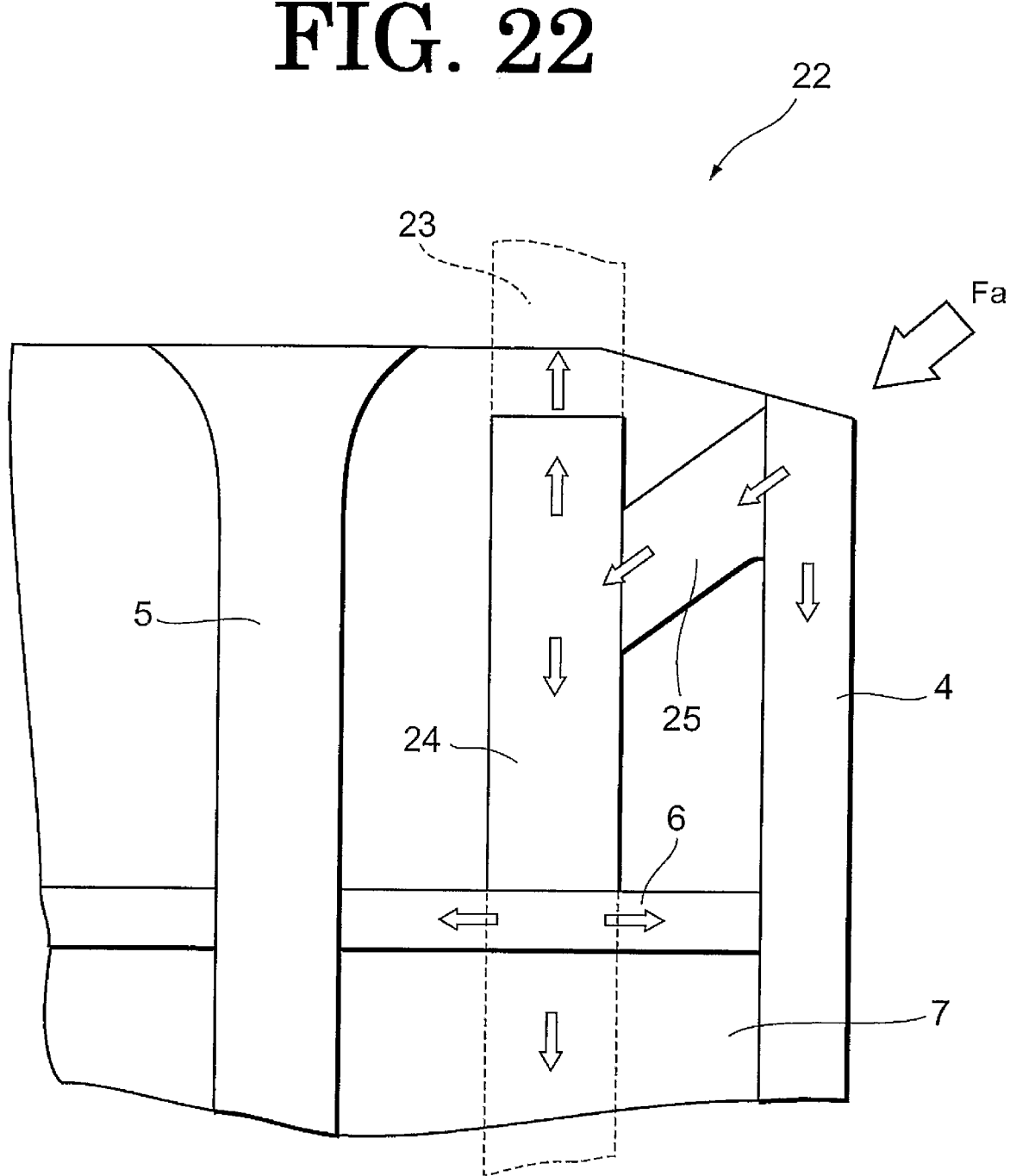
FIG. 22 is the plan view showing the manner in which the collision load is transferred in the vehicle lower body structure in FIG. 20.

FIG. 22 is the plan view showing the manner in which the collision load Fa is transferred, when another vehicle collides with the host vehicle obliquely with respect to the line extending in the longitudinal direction of the host vehicle without involving the front side member (not shown) and the collision load Fa is applied to the windshield pillar 3 from a position above the rocker 4. As shown in FIG. 22, when the collision load Fa is applied to the windshield pillar 3 from a position above the rocker 4 toward the lateral center and the rear of the vehicle compartment, the collision load Fa is transferred to the pillar brace 25. The collision load Fa transferred to the pillar brace 25 is transferred to the floorpan reinforcement member 24 to be dispersed. The collision load Fa transferred to the floorpan reinforcement member 24 is transferred to the side member 23 to be dispersed.

The collision load Fa transferred to the floorpan reinforcement member 24 is transferred directly to the side member 23, because the side member 23 and the floorpan reinforcement member 24 form a closed cross section with the floor panel 7 interposed between the side member 23 and the floorpan reinforcement member 24. Therefore, the efficiency of transferring the collision load Fa from the floorpan reinforcement member 24 to the side member 23 is drastically enhanced.

Connecting the pillar brace 25 to the floorpan reinforcement member 24 arranged near the windshield pillar 3 makes it possible to reduce the length of the pillar brace 25, and consequently, to enhance the efficiency of dispersing the collision load Fa. Also, forming a closed cross section by arranging the side member 23 and the floorpan reinforcement member 24 so as to face each other drastically enhances the efficiency of transferring the collision load Fa from the floorpan reinforcement member 24 to the side member 23.

Figure 23:
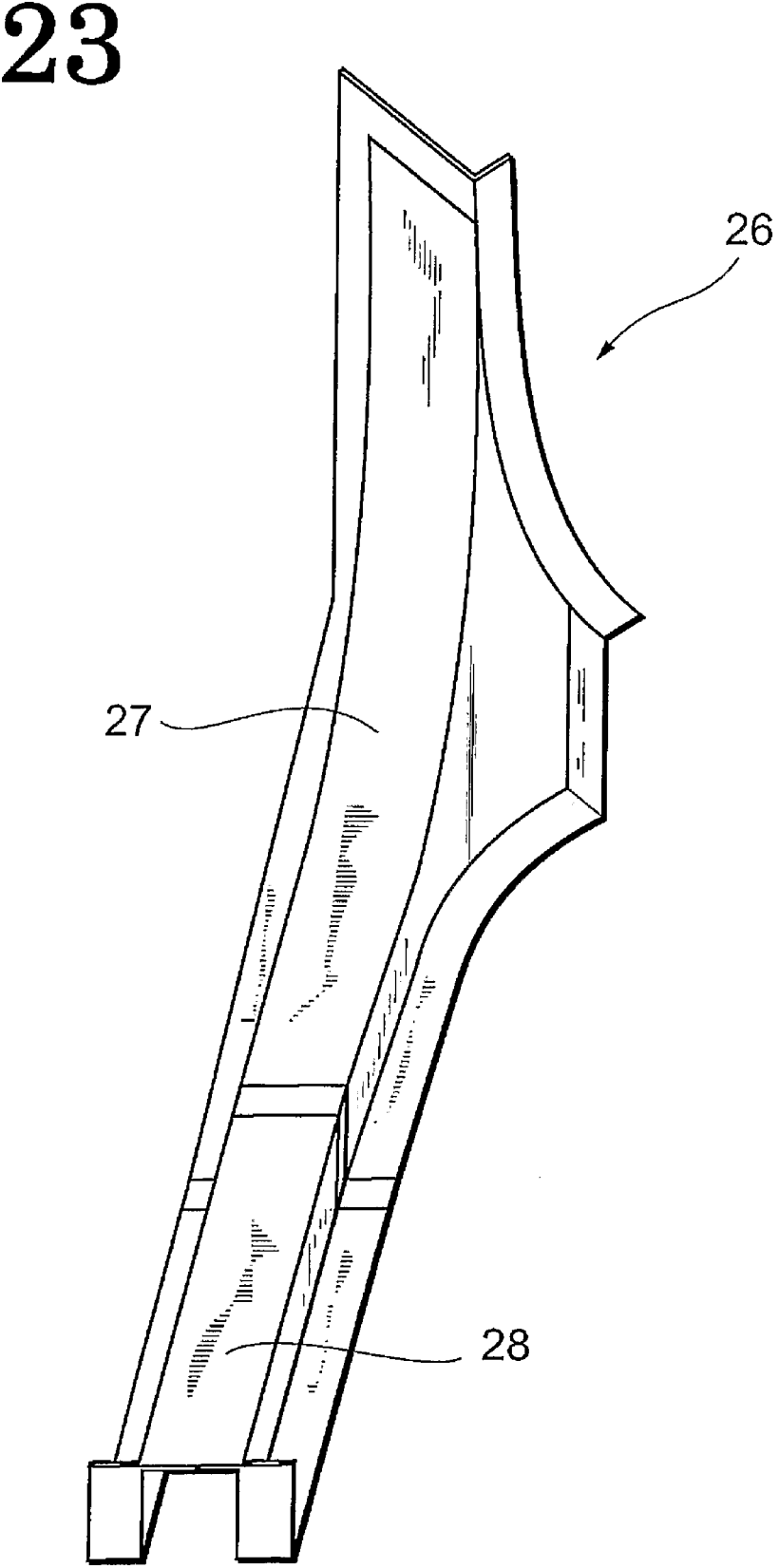
FIG. 23 is the perspective view showing a modified example of the pillar brace.

While the invention has been described with reference to the example embodiments thereof, it is to be understood that the invention is not limited to the example embodiments. For example, any types of pillar braces may be employed as long as the collision load applied to the windshield pillar is transferred via the pillar brace. For example, the pillar brace may be formed by combining multiple members. As shown in FIG. 23, a pillar brace 26 has a first portion 27, which is connected to the windshield pillar 3 and the rocker 4 and of which the cross section changes, and a second portion 28, which is connected to another frame member and of which the cross section does not change. The pillar brace 26 may be formed by connecting the first portion 27 to the second portion 28. Forming the pillar brace by connecting separate portions simplifies the process of forming the pillar brace.

The invention claimed is:

1. A vehicle lower body structure, comprising:
  a windshield pillar that is arranged at a side portion of a vehicle, and that extends in a vehicle-height direction;
  a rocker that is connected, at a front end portion, to a lower end portion of the windshield pillar, and that extends in a longitudinal direction of the vehicle; and
  a reinforcement member that is connected, at a portion, to a vehicle-compartment-side outer face of the windshield pillar, at a position above the rocker in the vehicle-height direction, and that transfers a collision load, applied to the windshield pillar, in a vehicle-width direction toward a lateral center of the vehicle and in the longitudinal direction of the vehicle toward a rear of the vehicle, the reinforcement member extending in the vehicle width direction toward the lateral center of the vehicle and in the longitudinal direction toward the rear of the vehicle, and is connected, at an end portion, to a floor cross-member that extends in the vehicle-width direction.

2. The vehicle lower body structure according to claim 1, wherein
the reinforcement member transfers the collision load, applied to the windshield pillar, to a vehicle floor assembly.

3. The vehicle lower body structure according to claim 1, wherein
the reinforcement member is connected, at another portion, to a rear-side outer face of the windshield pillar, at a position above the rocker in the vehicle-height direction.

4. The vehicle lower body structure according to claim 1, wherein
the reinforcement member is connected, at the other portion, to the rocker.

5. The vehicle lower body structure according to claim 1, wherein
the reinforcement member is formed integrally with the floor cross-member.

6. The vehicle lower body structure according to claim 1, wherein
the reinforcement member extends in the vehicle-width direction toward the lateral center of the vehicle and in the longitudinal direction of the vehicle toward the rear of the vehicle, and is connected, at an end portion, to a vehicle center frame member that is arranged at the lateral center of the vehicle and that extends in the longitudinal direction of the vehicle.

7. The vehicle lower body structure according to claim 6, wherein
the vehicle center frame member is a floor pan tunnel member.

8. The vehicle lower body structure according to claim 6, wherein
the vehicle center frame member is a floorpan reinforcement member that is arranged between a floor tunnel member and the rocker, and that extends in the longitudinal direction of the vehicle.

9. The vehicle lower body structure according to claim 1, comprising:
a bulkhead that is provided inside the windshield pillar, and that is arranged so as to face the reinforcement member with the windshield pillar interposed between the reinforcement member and the bulkhead.

* * * * *